US012651911B2

(12) United States Patent (10) Patent No.: US 12,651,911 B2
Liu et al. (45) Date of Patent: Jun. 9, 2026

(54) POWER SUPPLY SYSTEM FOR ELECTRICALLY DRIVEN WELLSITE FACILITY

(71) Applicant: YANTAI JEREH PETROLEUM EQUIPMENT & TECHNOLOGIES CO., LTD., Yantai (CN)

(72) Inventors: Kaishen Liu, Yantai (CN); Shouzhe Li, Yantai (CN); Jifeng Zhong, Yantai (CN); Zhuqing Mao, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 20 days.

(21) Appl. No.: 18/678,855

(22) Filed: May 30, 2024

(65) Prior Publication Data

US 2024/0313546 A1 Sep. 19, 2024

Related U.S. Application Data

(63) Continuation-in-part of application No. 17/693,170, filed on Mar. 11, 2022, now Pat. No. 12,021,389.

(30) Foreign Application Priority Data

Oct. 12, 2021 (CN) .......................... 202122451510.9

(51) Int. Cl.
*H02J 3/38* (2026.01)
(52) U.S. Cl.
CPC ..................................... *H02J 3/381* (2013.01)
(58) Field of Classification Search
CPC ....................................................... H02J 3/381
USPC ......................................................... 307/84
See application file for complete search history.

(56) References Cited

U.S. PATENT DOCUMENTS

| | | | |
|---|---|---|---|
| 1,711,979 | A | 5/1929 | Helmut |
| 2,015,745 | A | 10/1935 | Max |
| 3,035,222 | A | 5/1962 | Stone |
| 3,378,755 | A | 4/1968 | Sawyer |
| 3,453,443 | A | 7/1969 | Stoeckly |
| 3,794,377 | A | 2/1974 | Wachsmuth et al. |
| 3,815,965 | A | 6/1974 | Ostwald |

(Continued)

FOREIGN PATENT DOCUMENTS

| | | |
|---|---|---|
| CA | 2908276 A1 | 4/2016 |
| CN | 1154765 A | 7/1997 |

(Continued)

OTHER PUBLICATIONS

Second Office Action for Chinese Application No. 202011273318.9 mailed on Nov. 18, 2024.

(Continued)

*Primary Examiner* — Hal Kaplan
(74) *Attorney, Agent, or Firm* — Sheppard Mullin Richter & Hampton LLP

(57) ABSTRACT

A power supply system for an electrically driven wellsite facility is provided. The power supply system includes a combined power supply module configured to be connected with the electrically driven wellsite facility, the combined power supply module comprising at least one generator (or energy storage unit) and at least one power distribution station, wherein the at least one generator (or energy storage unit) and the at least one power distribution station are connected in series, disposed in parallel, or combined to a power grid for supplying power to the electrically driven wellsite facility.

25 Claims, 8 Drawing Sheets

(56)                References Cited

U.S. PATENT DOCUMENTS

| 4,136,432 A | 1/1979 | Melley, Jr. |
| 4,201,523 A | 5/1980 | Olofsson |
| 4,336,485 A | 6/1982 | Stroud |
| 4,393,966 A | 7/1983 | Kono et al. |
| 4,462,491 A | 7/1984 | Kono et al. |
| 4,720,645 A | 1/1988 | Stroudxx |
| 4,793,775 A | 12/1988 | Peruzzi |
| 4,877,118 A | 10/1989 | Tamura |
| 4,904,841 A | 2/1990 | English |
| 4,992,669 A | 2/1991 | Parmley |
| 5,274,322 A | 12/1993 | Hayashi et al. |
| 5,282,722 A | 2/1994 | Beatty |
| 5,517,822 A | 5/1996 | Haws et al. |
| 5,519,300 A | 5/1996 | Leon et al. |
| 5,614,799 A | 3/1997 | Anderson et al. |
| 5,691,590 A | 11/1997 | Kawai et al. |
| 5,714,821 A | 2/1998 | Dittman |
| 5,751,150 A | 5/1998 | Rippel et al. |
| 5,767,591 A | 6/1998 | Pinkerton |
| 5,821,660 A | 10/1998 | Anderson |
| 5,846,056 A | 12/1998 | Dhindsa et al. |
| 5,994,802 A | 11/1999 | Shichijyo et al. |
| 6,035,265 A | 3/2000 | Dister et al. |
| 6,121,707 A | 9/2000 | Bell et al. |
| 6,134,878 A | 10/2000 | Amako et al. |
| 6,249,726 B1 | 6/2001 | Burke, II et al. |
| 6,281,610 B1 | 8/2001 | Kliman et al. |
| 6,331,760 B1 | 12/2001 | Mclane, Jr. |
| 6,388,869 B1 | 5/2002 | Fauteux et al. |
| 6,417,592 B2 | 7/2002 | Nakamura et al. |
| 6,450,133 B1 | 9/2002 | Bernard et al. |
| 6,455,974 B1 | 9/2002 | Fogarty |
| 6,552,463 B2 | 4/2003 | Oohashi et al. |
| 6,704,993 B2 | 3/2004 | Fogarty |
| 6,765,304 B2 | 7/2004 | Baten et al. |
| 6,784,583 B2 | 8/2004 | Umeda |
| 6,786,051 B2 | 9/2004 | Kristich et al. |
| 6,893,487 B2 | 5/2005 | Alger et al. |
| 6,895,903 B2 | 5/2005 | Campion |
| 7,007,966 B2 | 3/2006 | Campion |
| 7,016,207 B2 | 3/2006 | Yamanaka et al. |
| 7,036,310 B2 | 5/2006 | Aoki et al. |
| 7,075,206 B1 | 7/2006 | Chen |
| 7,081,682 B2 | 7/2006 | Campion |
| 7,112,891 B2 | 9/2006 | Johnson et al. |
| 7,122,913 B2 | 10/2006 | Witten et al. |
| 7,221,061 B2 | 5/2007 | Alger et al. |
| 7,245,032 B2 | 7/2007 | Willets et al. |
| 7,291,954 B2 | 11/2007 | Kashihara et al. |
| 7,372,174 B2 | 5/2008 | Jones et al. |
| 7,511,385 B2 | 3/2009 | Jones et al. |
| 7,608,934 B1 | 10/2009 | Hunter |
| 7,615,877 B2 | 11/2009 | Willets et al. |
| 7,619,319 B1 | 11/2009 | Hunter |
| 7,635,926 B2 | 12/2009 | Willets et al. |
| 7,656,052 B2 | 2/2010 | Jones et al. |
| 7,667,342 B2 | 2/2010 | Matsumoto et al. |
| 7,692,321 B2 | 4/2010 | Jones et al. |
| 7,755,209 B2 | 7/2010 | Jones et al. |
| 7,921,914 B2 | 4/2011 | Bruins et al. |
| 8,159,082 B2 | 4/2012 | Gemin et al. |
| 8,294,285 B2 | 10/2012 | Hunter |
| 8,294,286 B2 | 10/2012 | Hunter |
| 8,362,638 B2 | 1/2013 | Gemin et al. |
| 8,459,958 B2 | 6/2013 | Renner |
| 8,495,869 B2 | 7/2013 | Beissler et al. |
| 8,519,591 B2 | 8/2013 | Nishimura |
| 8,587,136 B2 | 11/2013 | Williams |
| 8,670,260 B2 | 3/2014 | Wang et al. |
| 8,731,793 B2 | 5/2014 | Barbir et al. |
| 8,773,876 B2 | 7/2014 | Kuboyama et al. |
| 8,788,161 B2 | 7/2014 | Hofig et al. |
| 8,789,601 B2 | 7/2014 | Broussard et al. |
| 8,796,899 B2 | 8/2014 | Imazawa et al. |
| 8,811,048 B2 | 8/2014 | Zhang et al. |

| 9,103,193 B2 | 8/2015 | Coli et al. |
| 9,140,110 B2 | 9/2015 | Coli et al. |
| 9,166,495 B2 | 10/2015 | Guan |
| 9,209,704 B2 | 12/2015 | Huang |
| 9,267,457 B2 | 2/2016 | Lewis et al. |
| 9,316,676 B2 | 4/2016 | Dayan |
| 9,534,473 B2 | 1/2017 | Morris et al. |
| 9,562,420 B2 | 2/2017 | Morris et al. |
| 9,577,545 B2 | 2/2017 | Tan et al. |
| 9,641,112 B2 | 5/2017 | Harknett et al. |
| 9,945,578 B2 | 4/2018 | Vanberg et al. |
| 10,184,397 B2 | 1/2019 | Austin et al. |
| 10,411,635 B2 | 9/2019 | Takahashi |
| 10,523,130 B2 | 12/2019 | Bax et al. |
| 10,584,671 B2 | 3/2020 | Tunzini et al. |
| 10,648,311 B2 | 5/2020 | Oehring et al. |
| 10,855,142 B2 | 12/2020 | Cory |
| 10,865,624 B1 | 12/2020 | Cui et al. |
| 10,873,099 B1 | 12/2020 | Gurunathan et al. |
| 10,914,155 B2 | 2/2021 | Oehring et al. |
| 10,989,180 B2 | 4/2021 | Yeung et al. |
| 11,035,214 B2 | 6/2021 | Cui et al. |
| 11,109,508 B1 | 8/2021 | Yeung et al. |
| 11,125,066 B1 | 9/2021 | Yeung et al. |
| 11,162,484 B2 | 11/2021 | Peotter et al. |
| 11,200,762 B2 | 12/2021 | Bordwell et al. |
| 11,208,878 B2 | 12/2021 | Oehring et al. |
| 11,220,895 B1 | 1/2022 | Yeung et al. |
| 11,236,739 B2 | 2/2022 | Yeung et al. |
| 11,378,008 B2 | 7/2022 | Yeung et al. |
| 11,391,136 B2 | 7/2022 | Coli et al. |
| 11,434,737 B2 | 9/2022 | Oehring et al. |
| 11,459,863 B2 | 10/2022 | Robinson et al. |
| 11,530,602 B2 | 12/2022 | Yeung et al. |
| 11,542,786 B2 | 1/2023 | Hinderliter et al. |
| 11,578,580 B2 | 2/2023 | Oehring et al. |
| 11,629,584 B2 | 4/2023 | Yeung et al. |
| 11,859,482 B2 | 1/2024 | Yeung et al. |
| 11,952,996 B2 | 4/2024 | Oehring et al. |
| 12,065,968 B2 | 8/2024 | Yeung et al. |
| 12,084,952 B2 | 9/2024 | Robinson et al. |
| 12,116,875 B2 | 10/2024 | Oehring et al. |
| 2003/0007369 A1 | 1/2003 | Gilbreth et al. |
| 2003/0030246 A1 | 2/2003 | Campion |
| 2003/0033994 A1 | 2/2003 | Campion |
| 2003/0057704 A1 | 3/2003 | Baten et al. |
| 2003/0064858 A1 | 4/2003 | Saeki et al. |
| 2003/0079479 A1 | 5/2003 | Kristich et al. |
| 2004/0081561 A1 | 4/2004 | Iwanami et al. |
| 2004/0104577 A1 | 6/2004 | Alger et al. |
| 2004/0174723 A1 | 9/2004 | Yamanaka et al. |
| 2004/0182652 A1 | 9/2004 | Ammon et al. |
| 2005/0093496 A1 | 5/2005 | Tokunou et al. |
| 2005/0241884 A1 | 11/2005 | Ghanemi et al. |
| 2006/0066105 A1 | 3/2006 | Johnson et al. |
| 2006/0066108 A1 | 3/2006 | Willets et al. |
| 2006/0080971 A1 | 4/2006 | Smith et al. |
| 2006/0208594 A1 | 9/2006 | Kashihara et al. |
| 2006/0260331 A1 | 11/2006 | Andreychuk |
| 2007/0108771 A1 | 5/2007 | Jones et al. |
| 2007/0121354 A1 | 5/2007 | Jones et al. |
| 2007/0216452 A1 | 9/2007 | Matsumoto et al. |
| 2009/0146426 A1 | 6/2009 | Jones et al. |
| 2009/0146500 A1 | 6/2009 | Jones et al. |
| 2009/0147549 A1 | 6/2009 | Jones et al. |
| 2009/0308602 A1 | 12/2009 | Bruins et al. |
| 2010/0045237 A1 | 2/2010 | Liu |
| 2010/0060076 A1 | 3/2010 | Gemin et al. |
| 2010/0084922 A1 | 4/2010 | Gollentz et al. |
| 2010/0135840 A1 | 6/2010 | Fujimoto et al. |
| 2011/0061411 A1 | 3/2011 | Kim et al. |
| 2012/0002454 A1 | 1/2012 | Kuboyama et al. |
| 2012/0065787 A1 | 3/2012 | Broniak et al. |
| 2012/0153935 A1 | 6/2012 | Gao et al. |
| 2012/0175947 A1 | 7/2012 | Gemin et al. |
| 2012/0248922 A1 | 10/2012 | Imazawa et al. |
| 2012/0255734 A1 | 10/2012 | Coli et al. |
| 2012/0292992 A1 | 11/2012 | Williams |
| 2012/0326668 A1 | 12/2012 | Ballatine et al. |

(56)                References Cited

U.S. PATENT DOCUMENTS

| | | |
|---|---|---|
| 2013/0030742 A1 | 1/2013 | Banerjee et al. |
| 2013/0049733 A1 | 2/2013 | Neti et al. |
| 2013/0063070 A1 | 3/2013 | Zhang et al. |
| 2013/0182468 A1 | 7/2013 | Guan |
| 2013/0184884 A1 | 7/2013 | More et al. |
| 2013/0228345 A1 | 9/2013 | Aho et al. |
| 2013/0229836 A1 | 9/2013 | Wang et al. |
| 2013/0234522 A1 | 9/2013 | Tan et al. |
| 2013/0255153 A1 | 10/2013 | Sasaki et al. |
| 2014/0010671 A1 | 1/2014 | Cryer et al. |
| 2014/0049285 A1 | 2/2014 | Rodriguez |
| 2014/0096974 A1 | 4/2014 | Coli et al. |
| 2014/0138079 A1 | 5/2014 | Broussard et al. |
| 2014/0167810 A1 | 6/2014 | Neti et al. |
| 2014/0174717 A1 | 6/2014 | Broussard et al. |
| 2014/0210213 A1 | 7/2014 | Campion et al. |
| 2014/0219824 A1 | 8/2014 | Burnette |
| 2014/0312823 A1 | 10/2014 | Huang |
| 2015/0027712 A1 | 1/2015 | Vicknair et al. |
| 2015/0061383 A1 | 3/2015 | Kobayashi |
| 2015/0068754 A1 | 3/2015 | Coli et al. |
| 2015/0252661 A1 | 9/2015 | Glass |
| 2015/0260794 A1 | 9/2015 | Athikessavan et al. |
| 2015/0300145 A1 | 10/2015 | Coli et al. |
| 2015/0314255 A1 | 11/2015 | Coli et al. |
| 2015/0349387 A1 | 12/2015 | Inaba et al. |
| 2016/0041066 A1 | 2/2016 | Patenaude et al. |
| 2016/0075387 A1 | 3/2016 | Fong et al. |
| 2016/0105022 A1 | 4/2016 | Oehring et al. |
| 2016/0177675 A1 | 6/2016 | Morris et al. |
| 2016/0177678 A1 | 6/2016 | Morris et al. |
| 2016/0215769 A1 | 7/2016 | Haapanen et al. |
| 2016/0358311 A1 | 12/2016 | Chen et al. |
| 2016/0369609 A1 | 12/2016 | Morris et al. |
| 2017/0104389 A1 | 4/2017 | Morris et al. |
| 2017/0117748 A1 | 4/2017 | Mondal |
| 2017/0154387 A1 | 6/2017 | Somers |
| 2017/0159425 A1 | 6/2017 | Wood et al. |
| 2017/0222409 A1 | 8/2017 | Oehring et al. |
| 2017/0285062 A1 | 10/2017 | Kim |
| 2017/0292789 A1 | 10/2017 | Hjorth et al. |
| 2017/0302135 A1 | 10/2017 | Cory |
| 2017/0305284 A1 | 10/2017 | Koh et al. |
| 2018/0059754 A1 | 3/2018 | Shaikh et al. |
| 2018/0080376 A1 | 3/2018 | Austin et al. |
| 2018/0080377 A1 | 3/2018 | Austin et al. |
| 2018/0145511 A1 | 5/2018 | Biellmann |
| 2018/0156210 A1 | 6/2018 | Oehring et al. |
| 2018/0287386 A1 | 10/2018 | Oates et al. |
| 2018/0328157 A1 | 11/2018 | Bishop |
| 2019/0100989 A1 | 4/2019 | Stewart et al. |
| 2019/0128265 A1 | 5/2019 | Washio et al. |
| 2019/0157982 A1 | 5/2019 | Brueckner et al. |
| 2019/0169971 A1 | 6/2019 | Oehring et al. |
| 2019/0195292 A1 | 6/2019 | Pan et al. |
| 2019/0229643 A1 | 7/2019 | Bax et al. |
| 2019/0319459 A1 | 10/2019 | Brathwaite et al. |
| 2019/0331080 A1 | 10/2019 | Tunzini et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0109616 A1 | 4/2020 | Oehring et al. |
| 2020/0109617 A1 | 4/2020 | Oehring et al. |
| 2020/0270948 A1 | 8/2020 | Kothuru et al. |
| 2020/0325760 A1 | 10/2020 | Markham |
| 2020/0350790 A1 | 11/2020 | Luft et al. |
| 2021/0040830 A1 | 2/2021 | Mu et al. |
| 2021/0040836 A1 | 2/2021 | Baskin |
| 2021/0079902 A1 | 3/2021 | Yeung et al. |
| 2021/0095552 A1 | 4/2021 | Oehring et al. |
| 2021/0095648 A1 | 4/2021 | Buckley et al. |
| 2021/0102451 A1 | 4/2021 | Robinson et al. |
| 2021/0102530 A1 | 4/2021 | Pruitt et al. |
| 2021/0107616 A1 | 4/2021 | Pedersen |
| 2021/0108489 A1 | 4/2021 | Shampine |
| 2021/0199161 A1 | 7/2021 | Eto et al. |
| 2021/0207588 A1 | 7/2021 | Yeung et al. |
| 2021/0301630 A1 | 9/2021 | Krippner et al. |
| 2021/0310341 A1 | 10/2021 | Sherman et al. |
| 2022/0004179 A1 | 1/2022 | Badkoubeh |
| 2022/0018232 A1 | 1/2022 | Oehring et al. |
| 2022/0112889 A1 | 4/2022 | Yeung et al. |
| 2022/0112892 A1 | 4/2022 | Cui et al. |
| 2022/0213777 A1 | 7/2022 | Cui et al. |
| 2022/0298906 A1 | 9/2022 | Zhong et al. |
| 2022/0364448 A1 | 11/2022 | Oehring et al. |
| 2023/0055844 A1 | 2/2023 | Yeung et al. |
| 2023/0146951 A1 | 5/2023 | Robinson et al. |
| 2023/0203927 A1 | 6/2023 | Yeung et al. |
| 2023/0272699 A1 | 8/2023 | Oehring et al. |
| 2023/0296050 A1 | 9/2023 | Yeung et al. |
| 2023/0341035 A1 | 10/2023 | Messier et al. |
| 2024/0084680 A1 | 3/2024 | Robinson et al. |
| 2024/0093583 A1 | 3/2024 | Yeung et al. |
| 2024/0271387 A1 | 8/2024 | Nakamura |
| 2024/0295191 A1 | 9/2024 | Yeung et al. |
| 2024/0392666 A1 | 11/2024 | Robinson et al. |

FOREIGN PATENT DOCUMENTS

| | | |
|---|---|---|
| CN | 101636901 A | 1/2010 |
| CN | 101639040 A | 2/2010 |
| CN | 101728860 A | 6/2010 |
| CN | 201570910 U | 9/2010 |
| CN | 102494894 A | 6/2012 |
| CN | 102574475 A | 7/2012 |
| CN | 102602322 A | 7/2012 |
| CN | 102704895 A | 10/2012 |
| CN | 102810909 A | 12/2012 |
| CN | 103310963 A | 9/2013 |
| CN | 103456141 A | 12/2013 |
| CN | 103770852 A | 5/2014 |
| CN | 103913193 A | 7/2014 |
| CN | 104578389 A | 4/2015 |
| CN | 204386465 U | 6/2015 |
| CN | 105337397 A | 2/2016 |
| CN | 105352588 A | 2/2016 |
| CN | 105763337 A | 7/2016 |
| CN | 105973621 A | 9/2016 |
| CN | 106711990 A | 5/2017 |
| CN | 107208557 A | 9/2017 |
| CN | 107231000 A | 10/2017 |
| CN | 107240915 A | 10/2017 |
| CN | 107345857 A | 11/2017 |
| CN | 207652040 U | 7/2018 |
| CN | 108360818 A | 8/2018 |
| CN | 108900136 A | 11/2018 |
| CN | 208283527 U | 12/2018 |
| CN | 208337176 U | 1/2019 |
| CN | 109572449 A | 4/2019 |
| CN | 109765484 A | 5/2019 |
| CN | 110107490 A | 8/2019 |
| CN | 110118127 A | 8/2019 |
| CN | 110794032 A | 2/2020 |
| CN | 110821464 A | 2/2020 |
| CN | 210105993 U | 2/2020 |
| CN | 110932362 A | 3/2020 |
| CN | 210183018 U | 3/2020 |
| CN | 111173500 A | 5/2020 |
| CN | 111181159 A | 5/2020 |
| CN | 210745048 U | 6/2020 |
| CN | 210780534 U | 6/2020 |
| CN | 111628519 A | 9/2020 |
| CN | 111650514 A | 9/2020 |
| CN | 111679187 A | 9/2020 |
| CN | 111769551 A | 10/2020 |
| CN | 212671744 U | 3/2021 |
| CN | 213027453 U | 4/2021 |
| CN | 112983382 A | 6/2021 |
| CN | 112993965 A | 6/2021 |
| CN | 113006757 A | 6/2021 |
| CN | 113417737 A | 9/2021 |
| CN | 214227909 U | 9/2021 |
| CN | 214786070 U | 11/2021 |

(56)                    References Cited

FOREIGN PATENT DOCUMENTS

CN          215621353  U       1/2022
EP            2290776  A1      3/2011
KR        20210087308  A       7/2021

OTHER PUBLICATIONS

Supplemental Search Report for Chinese Application No. 202011273318.9 mailed on Oct. 30, 2024.
Rejection Decision for Chinese Application No. 202011273318.9 mailed on Apr. 16, 2025.
Notice of Allowance for U.S. Appl. No. 18/643,904 mailed on Feb. 4, 2025.
Third Office Action for Chinese Application No. 202011273318.9 mailed on Feb. 8, 2025.
Written Opinion of the International Searching Authority and International Search Report for PCT Application No. PCT/CN2019/102811 mailed on Mar. 19, 2020.
International Preliminary Report on Patentability Chapter I for PCT Application No. PCT/CN2019/102811 mailed on Dec. 23, 2021.
Non-Final Office Action for U.S. Appl. No. 16/834,446 mailed on Jun. 5, 2020.
Non-Final Office Action for U.S. Appl. No. 16/834,446 mailed on Jan. 6, 2021.
Non-Final Office Action for U.S. Appl. No. 17/242,316 mailed on May 26, 2022.
Search Report for Chinese Application No. 202110455679.3 mailed on May 28, 2022.
Written Opinion and International Search Report for PCT Application No. PCT/CN2022/076452 mailed on Jun. 1, 2022.
Non-Final Office Action for U.S. Appl. No. 17/728,667 mailed on Sep. 16, 2022.
Non-Final Office Action for U.S. Appl. No. 17/733,922 mailed on Sep. 21, 2022.
Written Opinion and International Search Report for PCT Application No. PCT/CN2021/132090 mailed on Jul. 7, 2022.
Non-Final Office Action for U.S. Appl. No. 17/884,358 mailed on Dec. 8, 2022.
Final Office Action for U.S. Appl. No. 17/733,922 mailed on Dec. 28, 2022.
First Search for Chinese Application No. 202280000733.8 mailed on Mar. 14, 2023.
First Search for Chinese Application No. 201910510411.8 mailed on Oct. 10, 2023.
Non-Final Office Action for U.S. Appl. No. 18/360,678 mailed on Feb. 28, 2024.
Non-Final Office Action for U.S. Appl. No. 17/693,170 mailed on Aug. 29, 2023.
Final office Action for U.S. Appl. No. 17/693,170 mailed on Dec. 8, 2023.
Notice of Allowance for U.S. Appl. No. 17/693,170 mailed on Feb. 22, 2024.
Non-Final Office Action for U.S. Appl. No. 17/774,815 mailed on Jun. 18, 2024.

Examination Report for Canadian Patent Application No. 3157232 mailed on Jun. 20, 2024.
Written Opinion and International Search Report for PCT Application No. PCT/CN2022/076321 mailed on Nov. 16, 2022.
Written Opinion of the International Searching Authority and International Search Report for PCT Application No. PCT/CN2020/137300 mailed on Aug. 13, 2021.
Non-Final Office Action for U.S. Appl. No. 17/155,966 mailed on Jul. 28, 2022.
Non-Final Office Action for U.S. Appl. No. 17/747,916 mailed on Aug. 18, 2022.
Final Office Action for U.S. Appl. No. 17/747,916 mailed on Nov. 10, 2022.
Non-Final Office Action for U.S. Appl. No. 18/303,181 mailed on Apr. 30, 2024.
Non-Final Office Action for U.S. Appl. No. 18/313,088 mailed on Mar. 28, 2024.
Non-Final Office Action for U.S. Appl. No. 17/167,391 mailed on Feb. 17, 2023.
Notice of Allowance for U.S. Appl. No. 17/884,358 mailed on Feb. 8, 2023.
Written Opinion of the International Searching Authority and International Search Report for PCT Application No. PCT/CN2020/137135 mailed on Aug. 23, 2021.
Final Office Action for U.S. Appl. No. 17/155,966 mailed on Sep. 14, 2022.
First Office Action for Chinese Application No. 202011273318.9 mailed on Sep. 2, 2024.
First Search for Chinese Application No. 202011273318.9 mailed on Aug. 27, 2024.
International Preliminary Report on Patentability Chapter I for International Application No. PCT/CN2022/076321 mailed on Aug. 29, 2024.
Notice of Allowance for U.S. Appl. No. 18/303,181 mailed on Aug. 21, 2024.
Notice of Allowance for U.S. Appl. No. 18/313,088 mailed on Aug. 23, 2024.
Notice of Allowance for U.S. Appl. No. 18/360,678 mailed on Aug. 20, 2024.
Notice of Allowance for U.S. Appl. No. 17/774,815 mailed on Sep. 30, 2024.
Notice of Allowance for U.S. Appl. No. 18/311,042 mailed on Sep. 27, 2024.
International Preliminary Report on Patentability Chapter I for PCT Application No. PCT/CN2022/076452 mailed on Aug. 29, 2024.
Notice of Allowance for U.S. Appl. No. 17/774,795 mailed on Sep. 20, 2024.
First Office Action for Chinese Application No. 202280000739.5 mailed on May 30, 2025.
Non-Final Office Action for U.S. Appl. No. 18/984,633 mailed on Nov. 6, 2025.
Notice of Allowance for Canadian Application No. 3157735 mailed on Oct. 1, 2025.
Notice of Allowance for Canadian Application No. 3157232 mailed on Oct. 23, 2025.
Non-Final Office Action for U.S. Appl. No. 18/952,120 mailed on Sep. 24, 2025.

POWER SUPPLY SYSTEM FOR ELECTRICALLY DRIVEN WELLSITE FACILITY

For all purpose, the application is a continuation-in-part of U.S. patent application Ser. No. 17/693,170, filed on Mar. 11, 2022; which claims priority to the Chinese patent application No. 202122451510.9, filed on Oct. 12, 2021, the entire disclosure of each of the above applications is incorporated herein by reference as part of the present application.

TECHNICAL FIELD

Embodiments of the present disclosure relate to a power supply system for an electrically driven wellsite facility.

BACKGROUND

Shale gas, natural gas extracted from shale beds, is an important unconventional natural gas resource and contains methane as a principal component. The formation and enrichment of the shale gas have own unique characteristics, i.e., the shale gas is often distributed in thick and widespread shale beds in basins. Compared with conventional natural gas, it is harder to develop shale gas reservoirs with higher requirements on construction equipment and processes.

Fracturing is a method for forming cracks in an oil or gas reservoir under hydraulic action during oil or gas extraction, which is thus also called hydraulic fracturing. A fracturing unit generally includes a fracturing facility for pumping a high pressure fluid into a well, a sand blender for mixing and supplying a proppant and a fracturing fluid to the fracturing facility, and instruments for monitoring the whole set of facilities. Traditionally, the fracturing facility is driven by an engine, and this may result in low power density, loud noise, and serious emission pollution. As a novel fracturing facility, electrically driven fracturing facility is driven by an electric motor. Using electric energy as power source, the electrically driven fracturing facility is high in power density and low in noise with no exhaust emission, and thus has been increasingly applied to fracturing operation.

SUMMARY

At least one embodiment of the disclosure provides a power supply system for an electrically driven wellsite facility, comprising a combined power supply module configured to be connected with the electrically driven wellsite facility, the combined power supply module comprising at least one generator and at least one power distribution station, wherein the at least one generator and the at least one power distribution station are disposed in parallel or combined to a power grid for supplying power to the electrically driven wellsite facility.

For example, in the power supply system according to at least one embodiment of the disclosure, an output voltage of the generator is 10 kV to 15 kV.

For example, in the power supply system according to at least one embodiment of the disclosure, the generator is a turbine generator.

For example, in the power supply system according to at least one embodiment of the disclosure, each power distribution station and each generator are disposed in parallel, and wherein an output end of the generator is configured to be connected with the electrically driven wellsite facility, and an output end of the power distribution station is configured to be connected with the electrically driven wellsite facility.

For example, the power supply system according to at least one embodiment of the disclosure further comprises a wellsite power distribution facility, wherein the wellsite power distribution facility is disposed between the combined power supply module and the electrically driven wellsite facility; and an input end of the wellsite power distribution facility is electrically connected to the output end of the generator and the output end of the power distribution station, and an output end of the wellsite power distribution facility is configured to be connected with the electrically driven wellsite facility.

For example, in the power supply system according to at least one embodiment of the disclosure, the combined power supply module further comprises a first parallel operation device which is disposed between the generator and the wellsite power distribution facility and electrically connected to each of the output end of the generator and the wellsite power distribution facility.

For example, in the power supply system according to at least one embodiment of the disclosure, the power distribution station and the corresponding generator are combined to a power grid, and wherein an input end of the power distribution station is electrically connected to an output end of the generator, and an output end of the power distribution station is electrically connected to the electrically driven wellsite facility.

For example, the power supply system according to at least one embodiment of the disclosure further comprises a wellsite power distribution facility, wherein the wellsite power distribution facility is disposed between the power distribution station and the electrically driven wellsite facility and configured to be connected with each of the output end of the power distribution station and the electrically driven wellsite facility.

For example, in the power supply system according to at least one embodiment of the disclosure, the combined power supply module further comprises a second parallel operation device which is disposed between the generator and the power distribution station and electrically connected to each of the output end of the generator and the power distribution station.

For example, the power supply system according to at least one embodiment of the disclosure further comprises an overhead line, wherein a head end of the overhead line is electrically connected to the output end of the power distribution station, and a tail end of the overhead line is electrically connected to the wellsite power distribution facility.

For example, in the power supply system according to at least one embodiment of the disclosure, the at least one power distribution station includes a first power distribution station, and the power supply system further comprises a voltage compensator, and wherein the voltage compensator is disposed between the tail end of the overhead line and the wellsite power distribution facility, with the tail end of the overhead line being connected to the wellsite power distribution facility by a connecting cable and the voltage compensator being electrically connected to the connecting cable.

For example, in the power supply system according to at least one embodiment of the disclosure, the first power distribution station includes a 10 kV power distribution station.

For example, in the power supply system according to at least one embodiment of the disclosure, the at least one power distribution station includes a second power distribution station, and the power supply system further comprises a step-down transformer, and wherein the step-down transformer is disposed between the tail end of the overhead line and the wellsite power distribution facility, with the step-down transformer being electrically connected to each of the tail end of the overhead line and the wellsite power distribution facility.

For example, in the power supply system according to at least one embodiment of the disclosure, the combined power supply module further comprises a step-up transformer which is disposed between the second power distribution station and the second parallel operation device and electrically connected to each of the second parallel operation device and the second power distribution station.

For example, in the power supply system according to at least one embodiment of the disclosure, the second power distribution station includes a 35 kV power distribution station.

At least one embodiment of the disclosure provides a power supply system comprising a first generator and a first power distribution station, wherein the first generator and the first power distribution station are connected in series; and a first parallel operation device disposed between the first generator and the first power distribution station, wherein the first parallel operation device includes an input end connected to an output end of the first generator and an output end connected to an input end of the first power distribution station, wherein the first parallel operation device is configured to regulate one or more of a frequency, a voltage, and a phase of the first generator.

For example, in the power supply system according to at least one embodiment of the disclosure, an output voltage of the first generator is 10 to 15 kV.

For example, in the power supply system according to at least one embodiment of the disclosure, the output voltage of the first generator is 13.8 kV.

For example, in the power supply system according to at least one embodiment of the disclosure, the first generator is a turbine generator.

For example, in the power supply system according to at least one embodiment of the disclosure, the first parallel operation device includes a synchronizing device.

For example, in the power supply system according to at least one embodiment of the disclosure, the power supply system further comprises a second generator and a second power distribution station disposed in parallel.

For example, in the power supply system according to at least one embodiment of the disclosure, the power supply system further comprises a second parallel operation device electrically connected to an output end of the second generator.

For example, in the power supply system according to at least one embodiment of the disclosure, the power supply system further comprises a first overhead line, wherein a head end of the first overhead line is electrically connected to an output end of the second power distribution station.

For example, in the power supply system according to at least one embodiment of the disclosure, the power supply system further comprises a first voltage compensator disposed at an tail end of the first overhead line.

For example, in the power supply system according to at least one embodiment of the disclosure, a power distribution voltage of the second power distribution station is 10 to 15 kV.

For example, in the power supply system according to at least one embodiment of the disclosure, the power supply system further comprises a third power distribution station, a second overhead line, and a first step-down transformer connected in series, wherein the second overhead line has a head end connected to an output end of the third power distribution station, and a tail end connected to the first step-down transformer.

For example, in the power supply system according to at least one embodiment of the disclosure, the first step-down transformer comprises an automatic voltage regulator.

For example, in the power supply system according to at least one embodiment of the disclosure, the power supply system further comprises a third overhead line, wherein a head end of the third overhead line is electrically connected to an output end of the first power distribution station.

For example, in the power supply system according to at least one embodiment of the disclosure, the power supply system further comprises a second voltage compensator, wherein the second voltage compensator is disposed at a tail end of the third overhead line.

For example, in the power supply system according to at least one embodiment of the disclosure, a power distribution voltage of the first power distribution station is 10 to 15 kV.

For example, in the power supply system according to at least one embodiment of the disclosure, the power supply system further comprises a second step-down transformer, and the second step-down transformer is disposed at a tail end of the third overhead line.

For example, in the power supply system according to at least one embodiment of the disclosure, the power supply system further comprises a step-up transformer disposed between the first power distribution station and the first parallel operation device.

For example, in the power supply system according to at least one embodiment of the disclosure, a power distribution voltage of the first power distribution station is 35 kV.

In some embodiments, for example, an energy storage unit may be used in place of a generator in the above-described embodiments.

At least one embodiment of the disclosure provides a power supply system for an electrically driven wellsite facility, comprising a combined power supply module connected with the electrically driven wellsite facility, the combined power supply module comprising an energy storage unit and a first power distribution station, wherein the energy storage unit and the first power distribution station are connected in series, disposed in parallel, or combined to a power grid for supplying power to the electrically driven wellsite facility; and a wellsite power distribution facility disposed between the first power distribution station and the electrically driven wellsite facility, wherein the wellsite power distribution facility includes an input end connected to an output end of the first power distribution station and an output end connected to an input end of the electrically driven wellsite facility.

For example, in the power supply system according to at least one embodiment of the disclosure, the power supply system further comprises a first generator and a second power distribution station disposed in parallel, and wherein an output end of the first generator is connected with the electrically driven wellsite facility, and an output end of the second power distribution station is connected with the electrically driven wellsite facility.

For example, in the power supply system according to at least one embodiment of the disclosure, the input end of the wellsite power distribution facility is electrically connected to the output end of the first generator and the output end of the second power distribution station.

For example, in the power supply system according to at least one embodiment of the disclosure, the combined power supply module further comprises a parallel operation device which is disposed between the first generator and the well-site power distribution facility and electrically connected to the output end of the first generator and to the input end of the wellsite power distribution facility, wherein the parallel operation device includes an input end connected to an output end of the first generator, wherein the parallel operation device is configured to regulate one or more of a frequency, a voltage, and a phase of the first generator.

For example, in the power supply system according to at least one embodiment of the disclosure, the power supply system further comprises a first overhead line, wherein a head end of the first overhead line is electrically connected to the output end of the second power distribution station, and a tail end of the first overhead line is electrically connected to the wellsite power distribution facility.

For example, in the power supply system according to at least one embodiment of the disclosure, the power supply system further comprises a first voltage compensator disposed between the tail end of the first overhead line and the wellsite power distribution facility, with the tail end of the first overhead line being connected to the wellsite power distribution facility by a first connecting cable and the first voltage compensator being electrically connected to the first connecting cable.

For example, in the power supply system according to at least one embodiment of the disclosure, a power distribution voltage of the second power distribution station is 10 to 15 kV.

For example, For example, in the power supply system according to at least one embodiment of the disclosure, the power supply system further comprises a third power distribution station, a second overhead line, and a step-down transformer connected in series, wherein the second overhead line has a head end connected to an output end of the third power distribution station, and a tail end connected to a first side of step-down transformer; and a second side of the step-down transformer is connected to the input end of the wellsite power distribution facility.

For example, in the power supply system according to at least one embodiment of the disclosure, the power supply system further comprises a third overhead line, wherein a head end of the third overhead line is electrically connected to the output end of the first power distribution station, and a tail end of the third overhead line is electrically connected to the wellsite power distribution facility.

For example, in the power supply system according to at least one embodiment of the disclosure, the power supply system further comprises a second voltage compensator, and wherein the second voltage compensator is disposed between the tail end of the third overhead line and the wellsite power distribution facility, with the tail end of the third overhead line being connected to the wellsite power distribution facility by a second connecting cable, and the second voltage compensator being electrically connected to the second connecting cable.

For example, in the power supply system according to at least one embodiment of the disclosure, a power distribution voltage of the first power distribution station is 10 to 15 kV.

For example, in the power supply system according to at least one embodiment of the disclosure, the power supply system further comprises a second step-down transformer, and the second step-down transformer is disposed between the tail end of the third overhead line and the wellsite power distribution facility.

For example, in the power supply system according to at least one embodiment of the disclosure, the power supply system further comprises a step-up transformer connected with the first power distribution station.

For example, in the power supply system according to at least one embodiment of the disclosure, a power distribution voltage of first power distribution station is 35 kV.

BRIEF DESCRIPTION OF THE DRAWINGS

In order to more clearly illustrate the technical solutions in the embodiments or prior art of the present disclosure, the following is a brief description of the drawings required to be used in the description of the embodiments or prior art. It is clear that the drawings in the following description are only some of the embodiments of the present disclosure, and that other drawings may be obtained from these drawings without creative effort by those skilled in the art.

DETAILED DESCRIPTION

Figure 1A:
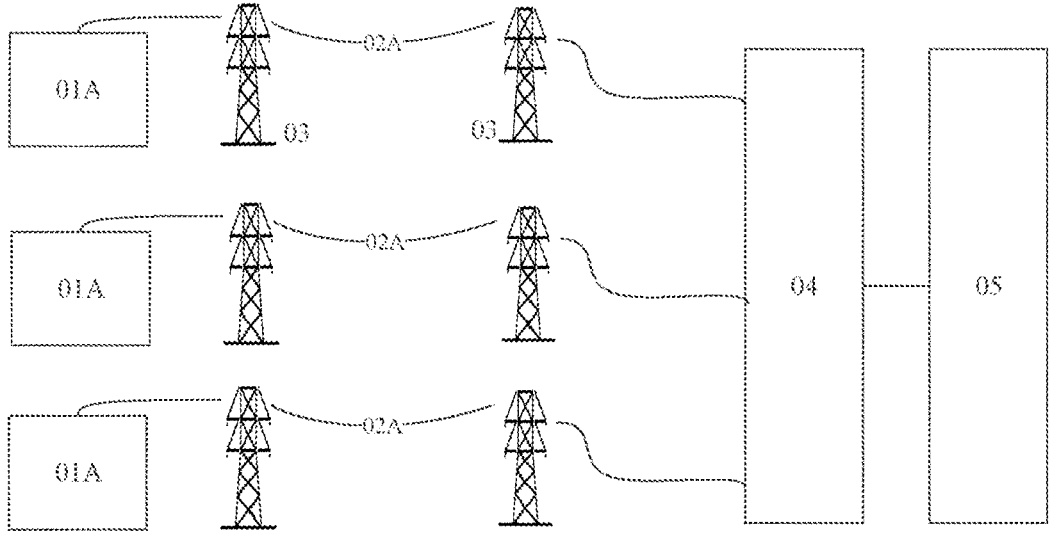
FIG. 1A is a schematic diagram of a 10 kV grid power supply system.

The technical solutions in the embodiments of the present disclosure will be clearly and completely described below in conjunction with the accompanying drawings in the embodiments of the present disclosure. Obviously, the embodiments described are only a part of the embodiments of the present disclosure, and not all of them. Based on the embodiments in the present disclosure, all other embodiments obtained by those skilled in the art without creative labor fall within the scope of protection of the present disclosure.

Unless otherwise defined, all terms used in embodiments of the present disclosure, including technical and scientific terms, have the same meaning as commonly understood by those skilled in the art to which the present disclosure belongs. It should also be understood that terms such as those defined in the ordinary dictionary should be interpreted to have a meaning consistent with their meaning in the context of the relevant technology, and should not be interpreted in an idealized or extremely formalized sense, unless expressly defined as such by embodiments of the present disclosure.

The terms "first," "second," and the like as used in embodiments of the present disclosure do not indicate any order, number, or importance, but are used only to distinguish the different components. The words "a," "an," or "the" and similar words do not indicate quantitative limitations, but rather the presence of at least one. Similarly, words such as "includes" or "contains" are intended to mean that the component or object preceding the word covers the component or object listed after the word and its equivalent, and does not exclude other components or objects. Similar words such as "connected" or "connected" are not limited to physical or mechanical connections, but may include electrical connections, whether direct or indirect. Flow charts are used in embodiments of the present disclosure to illustrate the steps of the method according to embodiments of the present disclosure. It should be understood that the preceding or following steps do not necessarily follow an exact sequence. Instead, various steps may be addressed in reverse order or simultaneously. Also, other operations may be added to these processes or a step or steps may be removed from these processes.

Usually, the most important part in electrical drive operation is the form of power supply. The electrical drive operation is high in power, generally about 30 MW, which is far beyond the power consumption of ordinary users. Therefore, a combination of a plurality of power supply modes is required for an electrically driven wellsite facility during electrical drive operation.

The inventors of the present disclosure have found that relatively single power supply is currently used for electrically driven wellsite facilities. For example, a power grid is used solely to supply power to an electrically driven wellsite facility. For another example, a generating set such as a turbine generator is used solely to supply power to an electrically driven wellsite facility.

Figure 1B:
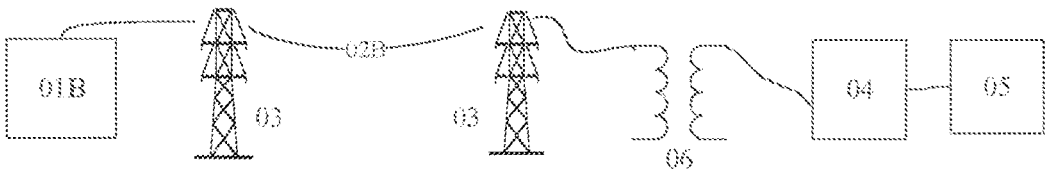
FIG. 1B is a schematic diagram of a 35 kV grid power supply system.
Figure 1C:
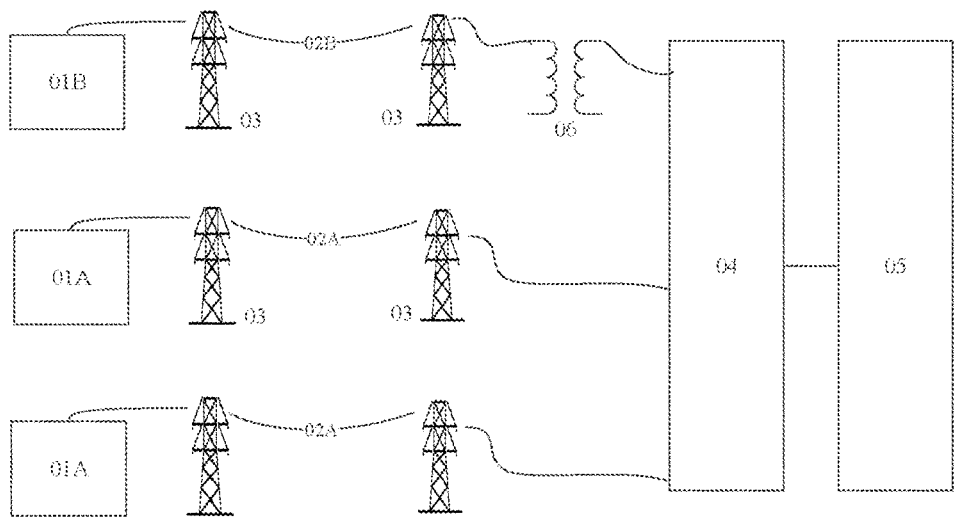
FIG. 1C is a schematic diagram of a 10 kV/35 kV hybrid grid power supply system.
Figure 1D:
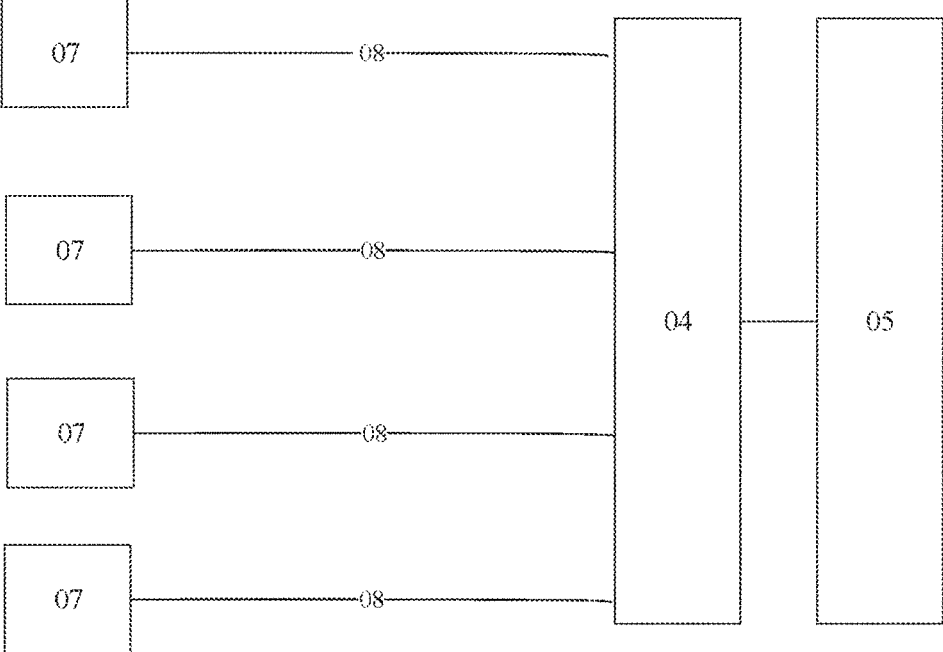
FIG. 1D is a schematic diagram illustrating power generation and supply by a generator.

FIG. 1A is a schematic diagram of a power supply system with a 10 kV power grid. FIG. 1B is a schematic diagram of a power supply system with a 35 kV grid. FIG. 1C is a schematic diagram of a power supply system with 10 kV/35 kV hybrid power grids. FIG. 1D is a schematic diagram illustrating power generation and supply by a generator.

As shown in FIG. 1A, the power supply system with the 10 kV power grid includes a plurality of 10 kV power distribution stations (also referred to as 10 kV power grid distribution stations) 01A, a plurality of towers 03, 10 kV overhead lines 02A, and a wellsite power distribution facility 04. Thus, power transmitted from the 10 KV power grid is supplied to an electrically driven wellsite facility 05. As shown in FIG. 1A, the power is transmitted from nearby 10 kV power distribution stations 01A through the 10 kV overhead lines 02A to the towers 03 in the vicinity of a well site, subsequently delivered from the towers 03 to the wellsite power distribution facility 04 by using connecting cables and then supplied to the electrically driven wellsite facility 05. In FIG. 1A, a simple equipment layout is shown with no need for a step-down transformer. However, in case of high power needed in electrical drive operation, the power from one 10 kV power supply line may be insufficient to meet the on-site power demand, and two or more 10 kV power supply lines may often be used to provide power. Moreover, without voltage compensation, it will easily lead to stepping down of system voltage. As a result, the facility will be prone to shutdown when the voltage of the power supply system is excessively low.

As shown in FIG. 1B, the power supply system with the 35 kV power grid includes a 35 kV power distribution station (also referred to as 35 kV power grid distribution station) 01B, a plurality of towers 03, a 35 kV overhead line 02B, and a wellsite power distribution facility 04. Thus, power transmitted from the 35 KV power grid is supplied to an electrically driven wellsite facility 05. As shown in FIG. 1B, the power is transmitted from nearby 35 kV power distribution station 01B through the 35 kV overhead line 02B to the tower 03 in the vicinity of a well site, subsequently delivered from the tower 03 to the wellsite power distribution facility 04 by using a connecting cable and then supplied to the electrically driven wellsite facility 05. In FIG. 1B, when the working voltage of the electrically driven wellsite facility 05 is about 10 kV, the power supply system with the 35 kV power grid further needs a transformer 06. The transformer 06 is disposed between the tower 03 in the vicinity of the well site and the wellsite power distribution facility 04 to transform the 35 kV voltage into about 10 kV voltage so that the power is smoothly supplied to the electrically driven wellsite facility 05. Since the 35 kV voltage is relatively high with high single-line power supply capacity, for most of the time, only one 35 kV power supply line can be used to meet the requirement of the well site.

As shown in FIG. 1C, the power supply system with 10 kV/35 kV hybrid power grid includes a plurality of 10 kV power distribution stations 01A, a single 35 kV power distribution station 01B, a plurality of towers 03, 10 kV overhead lines 02A, a 35 kV overhead line 02B, and a wellsite power distribution facility 04. Thus, power transmitted from 10 KV and 35 kV power grids is supplied to an electrically driven wellsite facility 05. As shown in FIG. 1C, the power is transmitted from nearby 10 kV power distribution stations 01A and 35 kV power distribution station 01B to the towers 03 in the vicinity of a well site through the 10 kV overhead lines 02A and the 35 kV overhead line 02B, respectively, subsequently delivered from the towers 03 to the wellsite power distribution facility 04 by using connecting cables and then supplied to the electrically driven wellsite facility 05. In FIG. 1C, when the working voltage of the electrically driven wellsite facility 05 is generally about 10 kV, the power grid corresponding to the 35 kV power supply further needs a transformer 06. The transformer 06 is disposed between the tower 03 in the vicinity of the well site and the wellsite power distribution facility 04 to transform the 35 kV voltage into about 10 kV voltage so that the power is smoothly supplied to the electrically driven wellsite facility 05. The power supply scheme with 10 kV/35 kV hybrid power grids involves two lines of power supply and can be adapted to different power grid environments, and when one line of power supply is out of order, the other line of power supply can still work normally. However, this power supply mode with hybrid power grids relates to the design of two power sources, and the technical solution is complex.

As shown in FIG. 1D, a generator power supply system includes a plurality of turbine generators 07, 10 kV cables 08, and a wellsite power distribution facility 04. Thus, the turbine generators 07 disposed within a well site generate power for supplying to an electrically driven wellsite facility 05. As shown in FIG. 1D, the power generated by the turbine generators 07 is transmitted to the wellsite power distribution facility 04 through a parallel operation device, and supplied to the electrically driven wellsite facility 05. In FIG. 1D, the power generated by the turbine generators 07 is transmitted to the wellsite power distribution facility without passing through the power grid. Due to a short transmission path, it is unnecessary to add a voltage compensator on site. However, in this case, a gas supply pipeline needs to be led into the well site to supply gas to the generators, and a long power supply pipeline needs to be laid.

Thus, the inventors of the present disclosure have found that when a power grid is used to supply power, infrastructures such as power supply cables need to be newly constructed for an operation area before supplying power. This scheme has the shortcomings of high initial investment, long construction period, poor economic performance, and the like. When turbine generators are used to supply power, although the power requirement of an electrically driven wellsite facility can be met and the initial investment of infrastructures can be saved, the power can only be transmitted to a well site. As a result, the maximum capacity of the generators cannot be exerted, thereby resulting in resource waste.

Embodiments of the present disclosure provide a power supply system for an electrically driven wellsite facility. The power supply system includes a combined power supply module configured for electrical connection with the electrically driven wellsite facility. The combined power supply module includes at least one generator and at least one power distribution station, where the at least one generator and the at least one power distribution station are disposed in parallel or combined to a power grid for supplying power to the electrically driven wellsite facility.

The power supply system provided in the embodiments of the present disclosure described above, which supplies power to an electrically driven wellsite facility using a power grid in combination with on-site generators, can be adapted to different wellsite operation situations and can meet the power requirements of various electrically driven wellsite facilities during operation.

The power supply system for an electrically driven wellsite facility provided in the embodiments of the present disclosure will be described below in detail with reference to the accompanying drawings.

Figure 2:
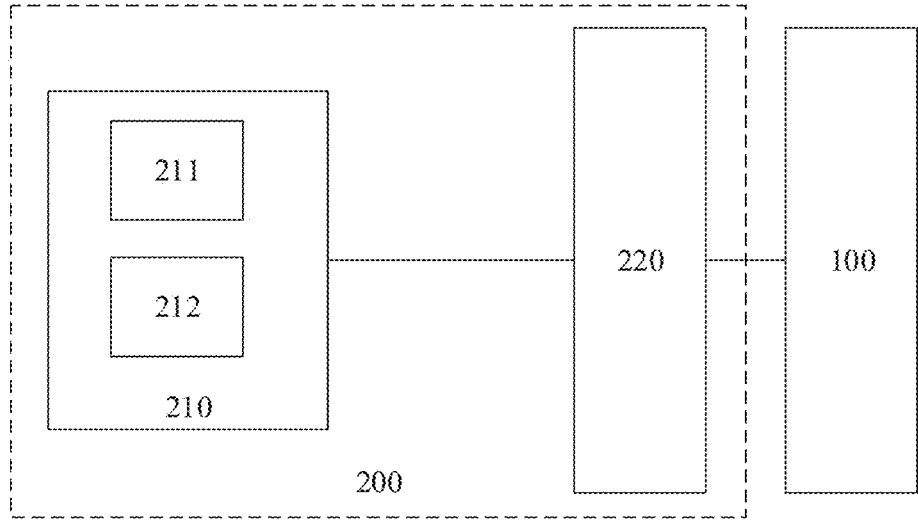
FIG. 2 is a schematic diagram illustrating a module of a power supply system for an electrically driven wellsite facility according to some embodiments of the present disclosure.

FIG. 2 is a schematic diagram illustrating a module of a power supply system for an electrically driven wellsite facility according to some embodiments of the present disclosure.

For example, as shown in FIG. 2, at least one embodiment of the present disclosure provides a power supply system 200 for an electrically driven wellsite facility 100. The power supply system 200 includes a combined power supply module 210 configured for electrical connection with the electrically driven wellsite facility 100. The combined power supply module 210 includes at least one generator 211 and at least one power distribution station 212. The at least one generator 211 and the at least one power distribution station 212 are disposed in parallel or combined to a power grid for supplying power to the electrically driven wellsite facility 100.

The power supply system 200 provided in the above embodiment, which supplies power to an electrically driven wellsite facility with a power grid in combination on-site generators, can be adapted to different wellsite operation situations and can meet the power requirements of various electrically driven wellsite facilities during operation.

For example, as shown in FIG. 2, the power supply system 200 further includes a wellsite power distribution facility 220. The wellsite power distribution facility 220 is configured to distribute power to and control the electrically driven wellsite facility 100 and may further provide power-off protection for the electrically driven wellsite facility 100. The wellsite power distribution facility 220 is disposed between the combined power supply module 210 and the electrically driven wellsite facility 100 and electrically connected to each of the combined power supply module 210 and the electrically driven wellsite facility 100.

It needs to be noted that FIG. 2 is a block diagram approximately illustrating the electrically driven wellsite facility 100 in the present disclosure, which does not limit the present disclosure. In some examples, the electrically driven wellsite facility 100 in the embodiments of the present disclosure may be one or more specific electrically driven wellsite facilities. For example, the electrically driven wellsite facilities 100 include a fracturing facility, a sand blender, a batcher, etc, which are not the focus of description in the present disclosure and will not be described redundantly here.

In some examples, the working voltage of the electrically driven wellsite facility 100 is about 10 kV. This is merely illustrative and not limiting of the present disclosure.

In some examples, the output voltage of the generator 211 is 10 kV to 15 kV. Thus, the generator 211 is suitable for the electrically driven wellsite facility 100, thus effectively supplying power to the electrically driven wellsite facility 100. For example, the output voltage of the generator 211 is 13.8 kV. This is merely illustrative and not limiting of the present disclosure.

In some examples, the generator 211 is a turbine generator. This is merely illustrative and not limiting of the present disclosure. For example, the generator 211 may further be other types of generators, which will not be described redundantly here.

Figure 3:
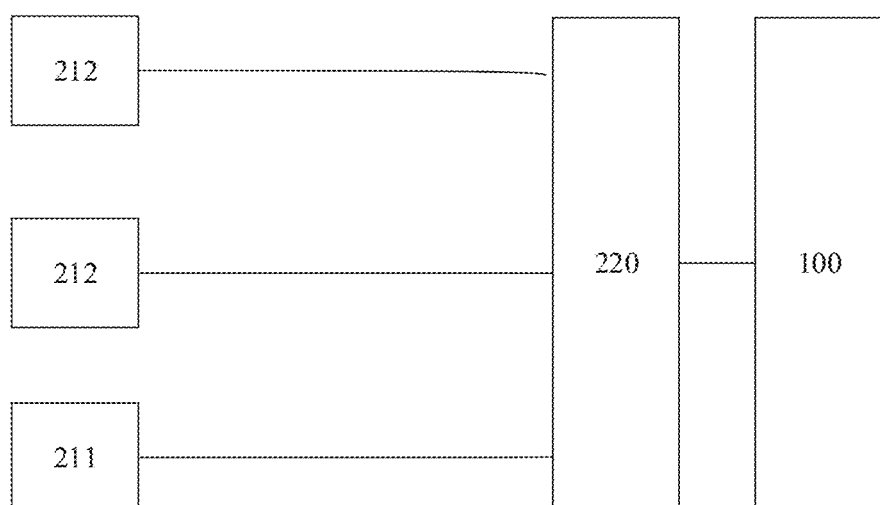
FIG. 3 is a schematic diagram illustrating a module of a power supply system with a generator and a power distribution station being disposed in parallel according to some embodiments of the present disclosure.

FIG. 3 is a schematic diagram illustrating a module of a power supply system with a generator and a power distribution station being disposed in parallel according to some embodiments of the present disclosure.

For example, as shown in FIG. 3, each power distribution station 212 (FIG. 3 merely shows two power distribution stations) is disposed in parallel to each generator 211 (FIG. 3 merely shows one generator 211). An output end of the generator 211 is electrically connected to an electrically driven wellsite facility 100, and an output end of the power distribution station 212 is electrically connected to the electrically driven wellsite facility 100.

Thus, the embodiments of the present disclosure may achieve combined power supply with a generator and an external power grid being disposed in parallel. For example, the generator is a turbine generator within a well site. The turbine generator and the external power grid can supply power to the electrically driven wellsite facility individually at the same time. Moreover, when one of the turbine generator and the external power grid is out of order, the power supply system can still work continuously, leading to high reliability of the power supply system.

In some examples, the combined power supply module 210 may include one or more power distribution stations 212, and one or more generators 211. The number of the power distribution stations and the number of generators will not be limited by the embodiments of the present disclosure and can be determined depending on the operation condition of a well site, which will not be described redundantly here.

For example, as shown in FIG. 2 and FIG. 3, the wellsite power distribution facility 220 is disposed between the combined power supply module 210 and the electrically driven wellsite facility 100, i.e., the wellsite power distribution facility 220 is disposed between the generator 211 and the electrically driven wellsite facility 100 and between the power distribution station 212 and the electrically driven wellsite facility 100. An input end of the wellsite power distribution facility 220 is electrically connected to each of the output end of the generator 211 and the output end of the power distribution station 212, respectively, and an output end of the wellsite power distribution facility 220 is electrically connected to the electrically driven wellsite facility 100. Thus, the embodiments of the present disclosure allow for power distribution and control on electrically driven wellsite facilities by disposing a wellsite power distribution facility in a well site, and achieve electrical drive operation for a plurality of electrically driven wellsite facilities such as a fracturing facility and a sand blender in the well site.

Figure 4:
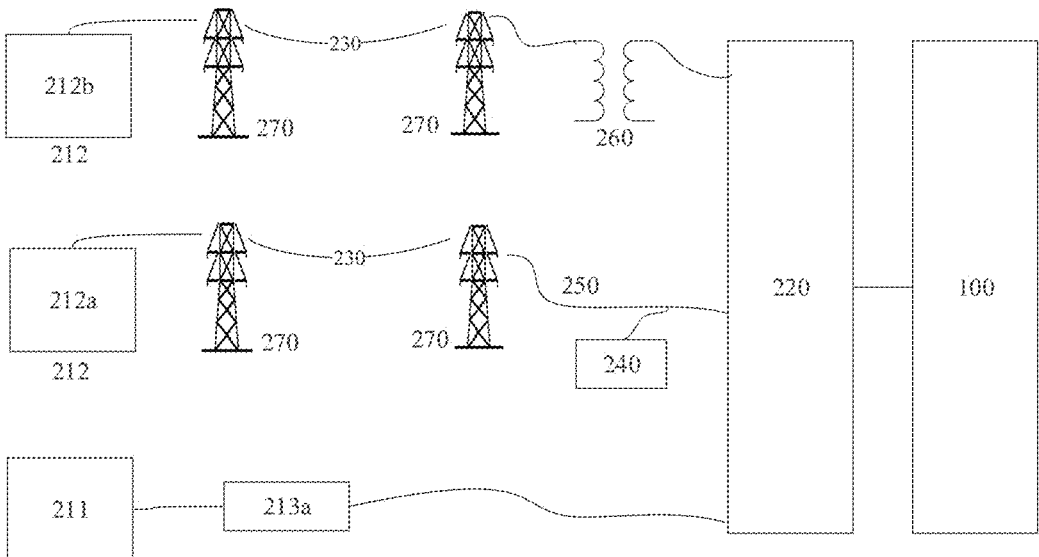
FIG. 4 is a schematic diagram of a power supply system with a generator and a power distribution station being disposed in parallel according to some embodiments of the present disclosure.

FIG. 4 is a schematic diagram of a power supply system with a generator and a power distribution station being disposed in parallel according to some embodiments of the present disclosure.

For example, as shown in FIG. 4, the combined power supply module 210 further includes a parallel operation device 213a (FIG. 4 merely shows one parallel operation device 213a). The parallel operation device 213a is disposed between a generator 211 (FIG. 4 merely shows one generator 211) and a wellsite power distribution facility 220 and electrically connected to each of an output end of the generator 211 and the wellsite power distribution facility 220. Thus, according to the embodiments of the present disclosure, the parallel operation device 213a is used to regulate the frequency, voltage and phase of the generator 211. The generator 211 is coupled with the wellsite power distribution facility 220 so that the power generated by the generator 211 is endlessly transmitted and supplied to an electrically driven wellsite facility 100. The parallel operation device 213a used in the embodiments of the present disclosure may be a parallel operation device in the prior art, which will not be described redundantly here. It needs to be noted that the parallel operation device 213a refers to a first parallel operation device of the present disclosure. For example, the parallel operation device may include a synchronizing device.

For example, as shown in FIG. 4, the power supply system 200 further includes an overhead line 230. A head end of the overhead line 230 is electrically connected to an output end of a power distribution station 212, and a tail end of the overhead line 230 is electrically connected to the wellsite power distribution facility 220. Thus, the power from an external power grid is transmitted to an electrically driven wellsite facility via the power distribution station 212 and through the overhead line 230.

For example, as shown in FIG. 4, at least one power distribution station 212 of the combined power supply module 210 includes a power distribution station 212a (FIG. 4 merely shows one power distribution station 212a). The power supply system 200 further includes a voltage compensator 240. The voltage compensator 240 is disposed between the tail end of the overhead line 230 and the wellsite power distribution facility 220. The tail end of the overhead line 230 is connected to the wellsite power distribution facility 220 by a connecting cable 250, and the voltage compensator 240 is electrically connected to the connecting cable 250. Thus, the power supply system 200 in this embodiment is simple in arrangement and can directly supply power to an electrically driven wellsite facility with no need for a transformer, and the voltage compensator 240 is disposed behind the power distribution station 212a so that the problem of decreasing of system voltage due to the rise of power during the operation of the facility can be avoided. As a result, the shutdown of the facility can be prevented when the system voltage is excessively low. The voltage compensator 240 used in the embodiments of the present disclosure may be a voltage compensator in the prior art, which will not be described redundantly here. It needs to be noted that the power distribution station 212a refers to a first power distribution station of the present disclosure.

For example, as shown in FIG. 4, at least one power distribution station 212 of the combined power supply module 210 includes a power distribution station 212b (FIG. 4 merely shows one power distribution station 212b). The power supply system 200 further includes a step-down transformer 260. The step-down transformer 260 is disposed between the tail end of the overhead line 230 and the wellsite power distribution facility 220 and electrically connected to each of the tail end of the overhead line 230 and the wellsite power distribution facility 220. Thus, according to the embodiments of the present disclosure, the step-down transformer 260 is disposed behind the power distribution station 212b to step down the voltage transmitted from the power distribution station 212b and transform the voltage into a voltage suitable for the electrically driven wellsite facility 100, thus smoothly supplying power to the electrically driven wellsite facility 100. It needs to be noted that the power distribution station 212b refers to a second power distribution station of the present disclosure.

For example, in the example of FIG. 4, the combined power supply module 210 may include one or more power distribution stations 212a, and one or more power distribution stations 212b. The number of the power distribution stations will not be limited by the embodiments of the present disclosure and can be determined depending on an actual situation, which will not be described redundantly here.

In some examples, a power distribution voltage of the power distribution station 212b is greater than that of the power distribution station 212a. For example, the power distribution station 212a includes a 10 kV power distribution station, and the power distribution station 212b includes a 35 kV power distribution station. This is merely illustrative and not limiting of the present disclosure. For example, the power distribution voltage of the power distribution station 212 in the embodiments of the present disclosure may range from 10 kV to 220 kV. In some examples, the power distribution voltage of the power distribution station may range from 10 kV to 15 kV. For example, the power distribution voltage of the power distribution station is 10 kV, 15 kV, or 13.8 kV.

In some examples, the overhead line 230 is adaptable to the power distribution voltage of the power distribution station 212. For example, when the power distribution station 212 is a 10 kV power distribution station, the overhead line 230 is a suitable 10 kV overhead line. For example, when the power distribution station 212 is a 15 kV power distribution station, the overhead line 230 is a suitable 15 kV overhead line. For another example, when the power distribution station 212 is a 35 kV power distribution station, the overhead line 230 is a suitable 35 kV overhead line.

In some examples, the step-down transformer 260 may be equipped with an automatic voltage regulator so that the problem of stepping down of system voltage due to the rise of power during the operation of a facility can be avoided. As a result, the protection shutdown of the facility can be prevented. The voltage regulator used in the embodiments of the present disclosure may be a voltage regulator in the prior art, which will not be described redundantly here.

For example, as shown in FIG. 3 and FIG. 4, the power supply system 200 in the above embodiments of the present disclosure supplies power to the electrically driven wellsite facility 100 using a plurality of lines of power supply. Thus, in case of high power needed in electrical drive operation, the power demand of a well site can also be met.

For example, as shown in FIG. 4, the power supply system 200 further includes a plurality of towers 270 (FIG. 4 merely shows two towers). The overhead line 230 is erected between every two towers 270 among a plurality of towers 270.

Figure 5:
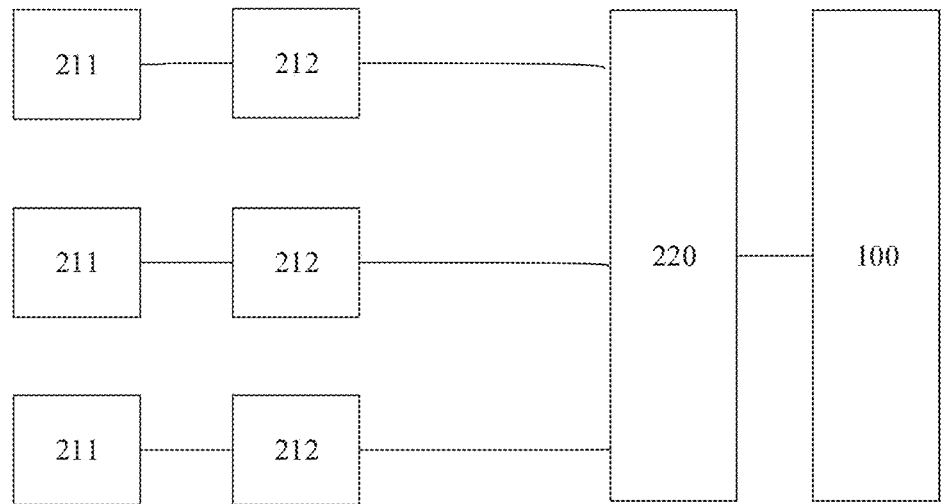
FIG. 5 is a schematic diagram illustrating a module of a power supply system with a generator and a power distribution station being combined to a power grid according to some embodiments of the present disclosure.

FIG. 5 is a schematic diagram illustrating a module of a power supply system with a generator and a power distribution station being combined to a power grid according to some embodiments of the present disclosure.

For example, as shown in FIG. 5, each power distribution station 212 (FIG. 5 shows three power distribution stations 212) and a corresponding generator 211 (FIG. 5 shows three generators 211) are combined to a power grid. The input end of each power distribution station 212 is electrically connected to the output end of the corresponding generator 211, and the output end of each power distribution station 212 is electrically connected to an electrically driven wellsite facility 100.

For example, in the example of FIG. 5, the combined power supply module 210 may include one or more power distribution stations 212. The number of the power distribution stations will not be limited by the embodiments of the present disclosure and can be determined depending on the actual demand of a well site.

Thus, according to the above embodiment of the present disclosure, generators are combined to an external power grid to achieve combined power supply. In this way, the power demand in operation in a well site can be met, and power can be transmitted to the power grid to produce extra economic benefits. As such, the generators can always work at full load. The power supply system can make full use of the generators, and the generators can be maintained and utilized favorably. For example, when an electrically driven wellsite facility operates, the power generated by the generators can be consumed. When the electrically driven wellsite facility stops operating, the power generated by the generators can be allocated to other places of the power grid.

For example, as shown in FIG. 5, the generators 211 are disposed in the vicinity of the power distribution stations 212 of the power grid, i.e., the power distribution stations 212 and the generators 211 are not within the well site. In this way, the electrical connection of the generators 211 with the power distribution stations 212 can be facilitated, and the generators 211 can be disposed in the vicinity of a gas source thereof. As such, compared with the generators being disposed within a well site, there is no need to lay a long gas supply pipeline in the embodiments of the present disclosure. As a result, the preliminary work load can be greatly saved, and resource waste can be avoided. Further, short construction period and good economic benefits can be achieved.

For example, in the example of FIG. 5, a wellsite power distribution facility 220 is disposed between the power distribution stations 212 and the electrically driven wellsite facility 100 and electrically connected to each of the output ends of the power distribution stations 212 and the electrically driven wellsite facility 100. Thus, the embodiments of the present disclosure allow for power distribution and control on electrically driven wellsite facilities by disposing a wellsite power distribution facility in a well site, and achieve electrical drive operation for a plurality of electrically driven wellsite facilities such as a fracturing facility and a sand blender in the well site.

Figure 6A:
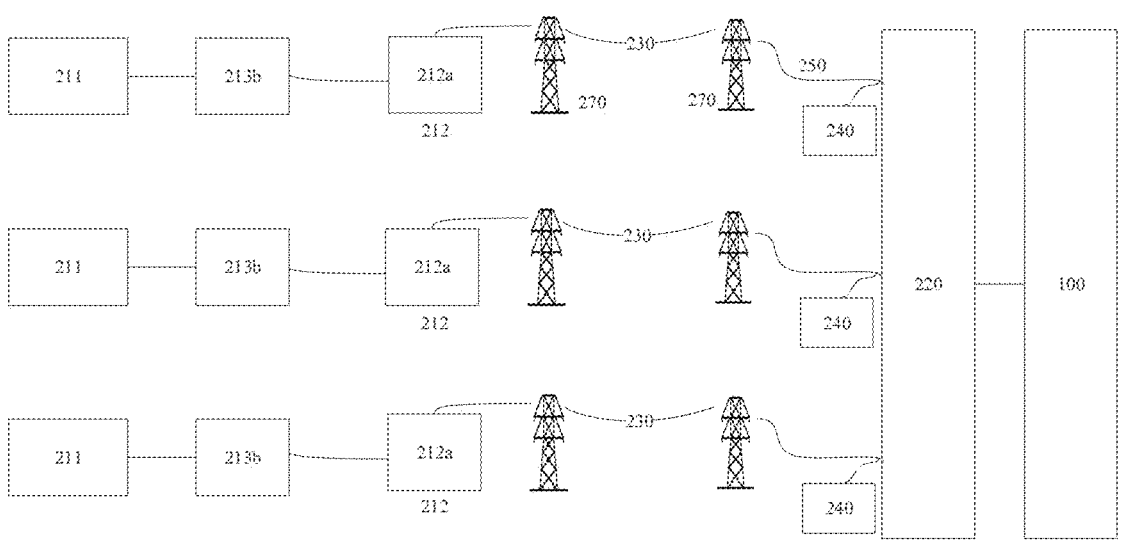
FIG. 6A is a schematic diagram of a power supply system with a generator and a power distribution station being combined to a power grid according to some embodiments of the present disclosure.

FIG. 6A is a schematic diagram of a power supply system with a generator and a power distribution station being combined to a power grid according to some embodiments of the present disclosure.

For example, as shown in FIG. 6A, the combined power supply module 210 further includes parallel operation devices 213b (FIG. 6A shows three parallel operation devices 213b). Each parallel operation device 213b is disposed between a corresponding generator 211 and a corresponding power distribution station 212 and electrically connected to the output end of the generator 211 and the power distribution station 212. As such, according to the embodiments of the present disclosure, the parallel operation devices 213b are used to regulate the frequencies, voltages and phases of the generators 211 for keeping consistent with those of the power distribution stations 212 of the power grid. The generators 211 can be coupled with the power distribution stations 212 of the power grid so that the power generated can be combined to the power grid. Accordingly, the power generated by the generators 211 is endlessly transmitted and supplied to an electrically driven wellsite facility 100. The parallel operation device 213b used in the embodiments of the present disclosure may be a parallel operation device in the prior art, which will not be described redundantly here. It needs to be noted that the parallel operation device 213b refers to a second parallel operation device of the present disclosure.

For example, as shown in FIG. 6A, the power supply system 200 further includes overhead lines 230. The head ends of the overhead lines 230 are electrically connected to the output ends of the power distribution stations 212, and the tail ends of the overhead lines 230 are electrically connected to a wellsite power distribution facility 220. Thus, the generators 211 are combined to the external power grid. Furthermore, the power generated by the generators 211 is delivered to nearby power distribution stations 212 through the parallel operation devices 213b. The power distribution stations 212 then transmit the power to the electrically driven wellsite facility 100 through the overhead lines 230.

For example, as shown in FIG. 6A, at least one power distribution station 212 of the combined power supply module 210 includes a power distribution station 212a (for example, three power distribution stations 212 shown in FIG. 6A are power distribution stations 212a). The power supply system 200 further includes voltage compensators 240 (FIG. 6A shows three voltage compensators 240), and each power distribution station 212a corresponds to one voltage compensator 240. The voltage compensators 240 are disposed between the tail ends of the overhead lines 230 and the wellsite power distribution facility 220. The tail ends of the overhead lines 230 are connected to the wellsite power distribution facility 220 by connecting cables 250, and the voltage compensators 240 are electrically connected to the corresponding connecting cables 250, respectively. Thus, the power supply system is simple in arrangement and can directly supply power to the electrically driven wellsite facility 100 with no need for a transformer, and the voltage compensators 240 are disposed behind the power distribution stations 212a so that the problem of stepping down of system voltage due to the rise of power during the operation of the facility can be avoided. As a result, the shutdown of the facility can be prevented when the system voltage is excessively low.

For example, in the example of FIG. 6A, the power distribution station 212a includes a 10 kV power distribution station. As a matter of course, this is merely illustrative and not limiting of the present disclosure.

For example, as shown in FIG. 6A, the power supply system 200 further includes a plurality of towers 270 (FIG. 6A merely shows two towers). The overhead line 230 is erected between every two towers 270 among a plurality of towers 270.

Figure 6B:
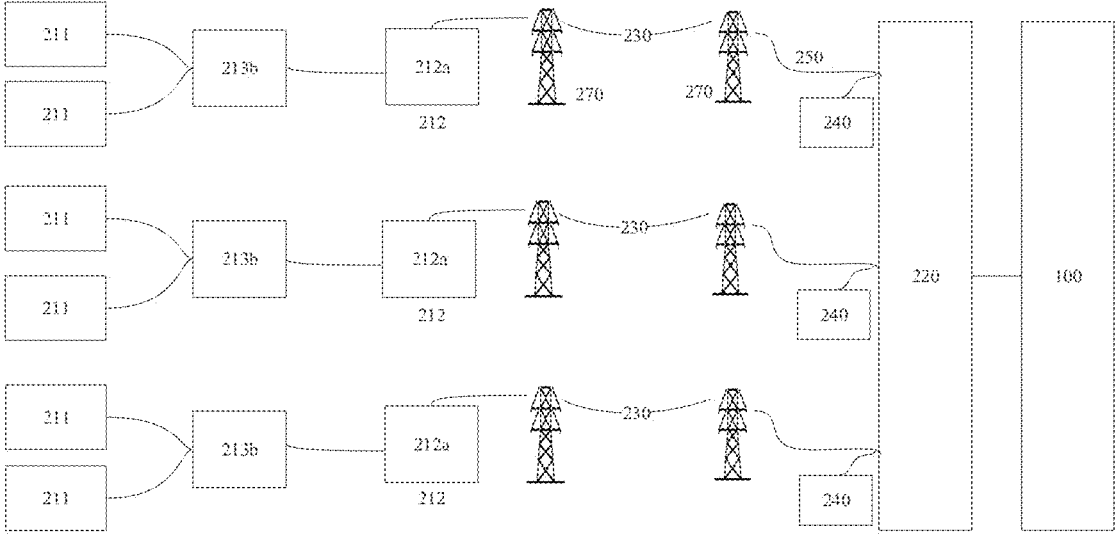
FIG. 6B is a schematic diagram of a power supply system with a generator and a power distribution station being combined to a power grid according to another embodiment of the present disclosure.

FIG. 6B is a schematic diagram of a power supply system with a generator and a power distribution station being combined to a power grid according to another embodiment of the present disclosure.

In some examples other than the example of FIG. 6A, as shown in FIG. 6B, the combined power supply module 210 includes at least one parallel operation device 213b (e.g., FIG. 6B shows three parallel operation devices 213b). Each parallel operation device 213b is disposed between a plurality of corresponding generators 211 and a corresponding power distribution station 212 and electrically connected to the output ends of the plurality of corresponding generators 211 and the power distribution station 212.

For example, in the example of FIG. 6B, each parallel operation device 213b and each power distribution station 212 correspond to two generators 211, respectively. This is merely illustrative and not limiting of the present disclosure. For example, each parallel operation device 213b may also correspond to more than three generators, which will not be described redundantly here. Thus, according to the embodiments of the present disclosure, the parallel operation devices 213b are used to regulate the frequencies, voltages and phases of the generators 211 for keeping consistent with those of the power distribution stations 212 of the power grid. A plurality of generators 211 are coupled in parallel for use, and the generators 211 and the corresponding power distribution stations 212 thus can be combined to the power grid. Accordingly, the power generated can be combined to the power grid and then supplied to the electrically driven wellsite facility 100.

For example, in the examples of FIG. 6A and FIG. 6B, the generators are combined to an external power grid to achieve combined power supply for an electrically driven wellsite facility. As such, the generators can always work at full load. The power supply system can make full use of the generators, and the generators can be maintained and utilized favorably.

Figure 7:
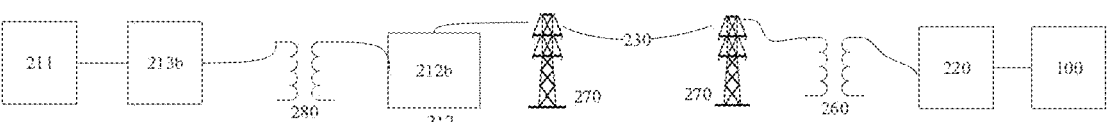
FIG. 7 is a schematic diagram of a power supply system with a generator and a power distribution station being combined to a power grid according to still another embodiment of the present disclosure.

FIG. 7 is a schematic diagram of a power supply system with a generator and a power distribution station being combined to a power grid according to still another embodiment of the present disclosure.

For example, as shown in FIG. 7, at least one power distribution station of the combined power supply module 210 includes a power distribution station 212b (FIG. 7 shows one power distribution station 212b). The power supply system 200 further includes an overhead line 230. The head end of the overhead line 230 is electrically connected to the output end of the power distribution station 212b, and the tail end of the overhead line 230 is electrically connected to a wellsite power distribution facility 220.

For example, as shown in FIG. 7, the power supply system 200 further includes a step-down transformer 260. The step-down transformer 260 is disposed between the tail end of the overhead line 230 and the wellsite power distribution facility 220 and electrically connected to each of the tail end of the overhead line 230 and the wellsite power distribution facility 220. Thus, according to the embodiments of the present disclosure, the step-down transformer 260 is disposed behind the power distribution station 212b to step down the voltage transmitted from the power distribution station 212b and transform the voltage into a voltage suitable for the electrically driven wellsite facility 100, thus smoothly supplying power to the electrically driven wellsite facility 100.

For example, as shown in FIG. 7, the combined power supply module 210 further includes a parallel operation device 213b (FIG. 7 shows one parallel operation device 213b). The parallel operation device 213b is disposed between a corresponding generator 211 and a corresponding power distribution station 212b and electrically connected to each of the output end of the generator 211 and the power distribution station 212b. Thus, according to the embodiments of the present disclosure, the parallel operation device 213b is used to regulate the frequency, voltage and phase of the generator 211 for keeping consistent with those of the power distribution station 212 of the power grid. The generators 211 can be coupled with the power distribution station 212b of the power grid so that the power generated can be combined to the power grid. Accordingly, the power generated by the generator 211 is endlessly transmitted and supplied to the electrically driven wellsite facility 100.

For example, as shown in FIG. 7, the combined power supply module 210 further includes a step-up transformer 280. The step-up transformer 280 is disposed between the power distribution station 212b and the parallel operation device 213b and electrically connected to each of the parallel operation device 213b and the power distribution station 212b. As such, the power generated by the generator 211 is delivered through the parallel operation device 213b and then stepped up in voltage by the step-up transformer 280 so that the voltage is adapted to the power distribution station 212b. Subsequently, the power distribution station 212b transmits the power to the step-down transformer 260 through the overhead line 230, and the step-down transformer 260 steps down the voltage transmitted from the power distribution station 212b and transforms the voltage into a voltage suitable for the electrically driven wellsite facility 100, thus smoothly supplying power to the electrically driven wellsite facility 100.

For example, in the example of FIG. 7, the power distribution station 212b includes a 35 kV power distribution station. Correspondingly, the power generated by the generator 211 passes through the power distribution station 213*b* and then is delivered to the step-up transformer 280 so that its voltage is stepped up to 35 kV. As a matter of course, this is merely illustrative and not limiting of the present disclosure. The step-up transformer 280 and the step-down transformer 260 used in the embodiments of the present disclosure may be transformers in the prior art, which will not be described redundantly here.

For example, in the example of FIG. 7, the generator is combined to an external power grid to achieve combined power supply for an electrically driven wellsite facility. As such, the generator can always work at full load. The power supply system can make full use of the generator, and the generator can be maintained and utilized favorably.

It needs to be noted that FIG. 7 merely illustrates the case in which each of the power distribution station 212*b* and the parallel operation device 213*b* corresponds to a single generator 211. However, the embodiments of the present disclosure are not limited thereto, and there may be a case in which each of the power distribution station 212*b* and the parallel operation device 213*b* corresponds to a plurality of generators 211 (see the above relevant description in the example of FIG. 6B for details), which will not be described redundantly here.

FIGS. 8 to 13 respectively show various configurations of an energy storage unit according to the present disclosure.

Figure 8:
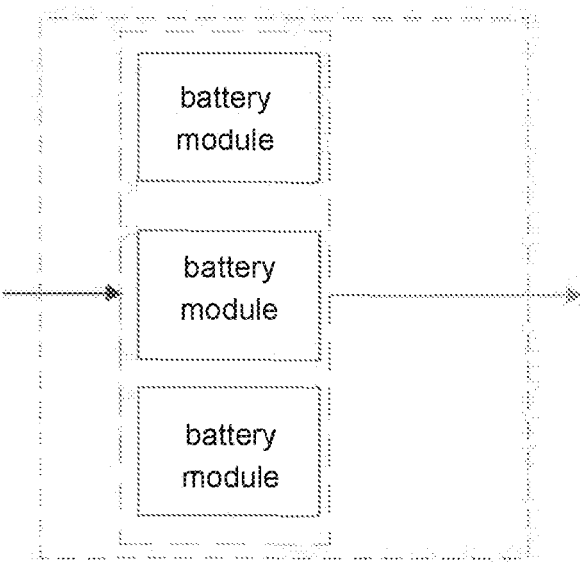
FIG. 8 is a schematic diagram of a first configuration of an energy storage unit according to some embodiments of the present disclosure.

As shown in FIG. 8, the energy storage unit includes a battery module for storing electrical energy. The battery module may specifically be chemical batteries and/or super capacitors or a combination of one or more of the above, etc. Wherein the chemical battery may be, for example, a lithium ion battery, a sodium ion battery or a lithium iron phosphate battery, etc.

In addition, although not shown in the drawings, it can be understood that in order to realize the functions of storing and supplying electrical energy by the battery module, the energy storage unit also includes a battery management module, a charging interface, a electric supply interface, a switch, and the like. The battery module can be electrically connected with the electricity supply unit via the charging interface and can be electrically connected with components needing power supply via the electric supply interface. The switch is used to control the on-off state of the electrical connection between the energy storage unit and other units. The battery management module can detect the key parameters of the battery module so as to protect the energy storage unit, such as under-voltage protection, overload protection, overcurrent protection, short circuit protection and over-temperature protection, etc. The battery management module may also have a minimum protected battery level. For example, the battery management module may be set a minimum protected battery level to ensure that the battery module stores sufficient backup battery level or achieve the purpose of protecting the battery. When approaching, reaching or falling below the set minimum protected battery level, the battery management module generates a corresponding instruction or cuts off the output power supply, such as sending out a prompt message.

In addition, the battery management module can be in communication connection with the centralized control unit of the fracturing system through wired, wireless, Ethernet and other communication methods. The centralized control unit can control the charging and power supply operation of the energy storage unit in a local control mode or a remote control mode. For example, the centralized control unit can control part of the battery modules of the energy storage unit to be charged while the other part of the battery modules to supply electrical energy; or the centralized control unit can control all battery modules to be charged at the same time; or the centralized control unit can control all battery modules to supply electrical energy at the same time. A charging protection program can also be set. When the frequency, current, voltage and temperature of charging are abnormal, the charging protection program can cut off the charging power supply to avoid safety accidents.

In addition, the centralized control unit can monitor the parameters of the energy storage unit such as battery level, temperature, current, voltage, etc. and can display these parameters to the operator. When the electricity supply unit or the energy storage unit is abnormal, the centralized control unit can judge the abnormal situation according to collected signals, and then display alarm information, or prompt operation precautions, or automatically control the functional unit, such as reducing power consumption, specifically, reducing VFD (Variable-Frequency Drive) output current or closing part or all of VFD output, or reducing flushing times of some fracturing pumps, etc. When an emergency occurs at the well site, the centralized control unit can be used for emergency shutdown. The centralized control unit can also turn off an output switch of the electricity supply unit or the electricity supply unit itself through a remote stop button or a remote stop command on the touch screen, specifically, for example, stopping running of turbine generator, or turning off an output switch of the energy storage unit or the energy storage unit itself, or stopping output current of VFD.

When the electricity supply unit stops supplying power due to emergency shutdown, the centralized control unit can automatically adjust power supply function of the energy storage unit according to preset conditions. For example, when turbine generator stops running, the centralized control unit can control the energy storage unit to supply power to the turbine engine, the centralized control unit and the like in an automatic or manual manner through a remote control mode or a local control mode so as to ensure engine lubrication, heat dissipation and stability of the centralized control unit.

When the electricity supply unit stops supplying electrical energy due to an emergency, the centralized control unit can adjust the power supply function of the energy storage unit according to a preset program in order to continue supplying power for the functional units necessary for operation at the well site, at the same time, the centralized control unit sends out prompt information to operator. The prompt information can include a prejudged operation duration information according to operation situation (inferring electrical energy consumption based on current power consumption or preset operating parameters of different stages of functional units), so that the operators can take necessary measures to continuously complete the operation, or temporarily reduce power consumption, etc., to avoid operation accidents such as well blockage caused by sudden shutdown.

Figure 9:
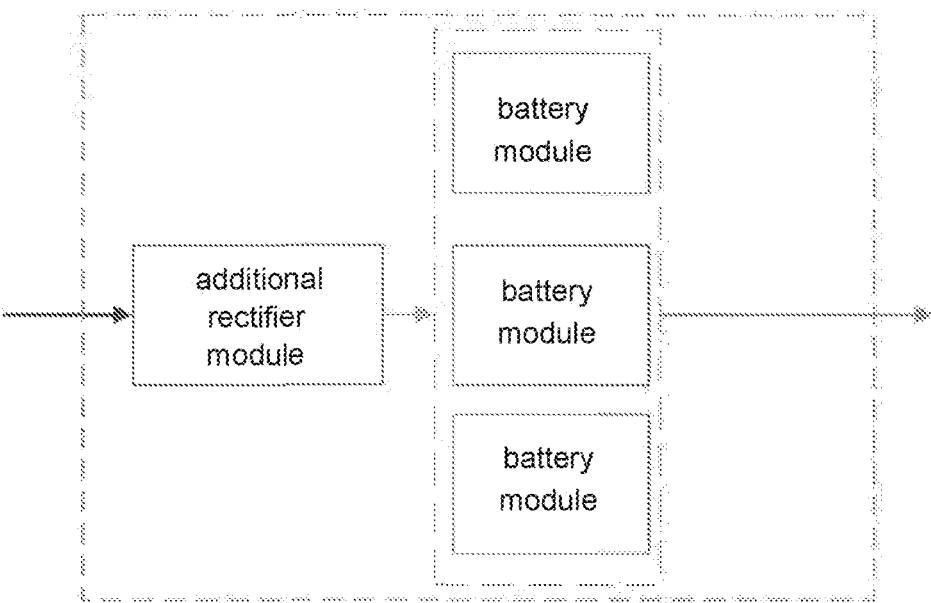
FIG. 9 is a schematic diagram of a second configuration of an energy storage unit according to another embodiment of the present disclosure.

FIG. 9 shows a second configuration of energy storage unit. Compared with the energy storage unit shown in FIG. 8, the energy storage unit shown in FIG. 9 further includes an additional rectifier module electrically connected between the charging interface and the battery module. The additional rectifying module can rectify charging current input to the energy storage unit, changing it from alternating current into direct current and providing sufficient charging voltage to the battery module. That is, the additional rectifying module can play a role of charging.

Figure 10:
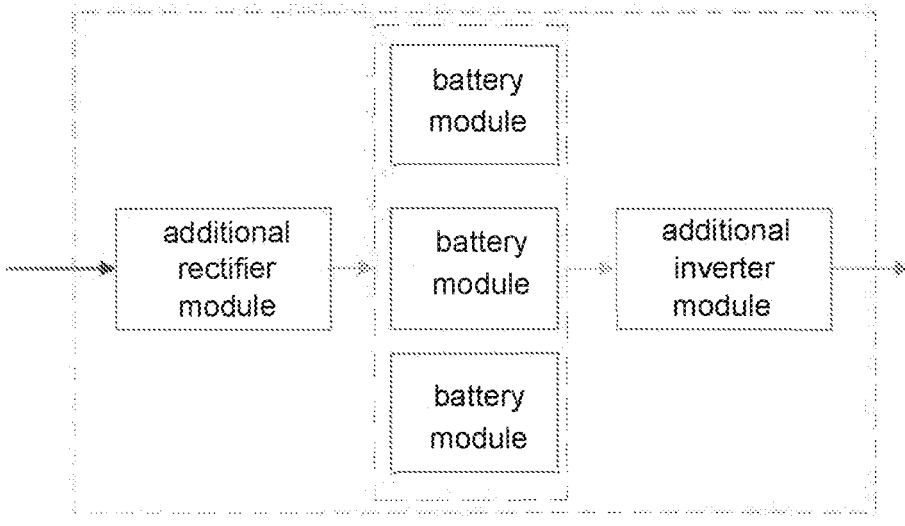
FIG. 10 is a schematic diagram of a third configuration of an energy storage unit according to still another embodiment of the present disclosure.

FIG. 10 shows a third configuration of energy storage unit. Compared with the energy storage unit shown in FIG. 9, the energy storage unit shown in FIG. 10 further includes an additional inverter module electrically connected between the battery module and the electric supply interface. The additional inverter module can convert direct current output by the battery module into alternating current with constant frequency and voltage or frequency modulation and voltage regulation. Therefore, the energy storage unit according to the third configuration can output alternating current. Correspondingly, the electric supply interface electrically connected with the additional inverter module is an AC electric supply interface.

Figure 11:
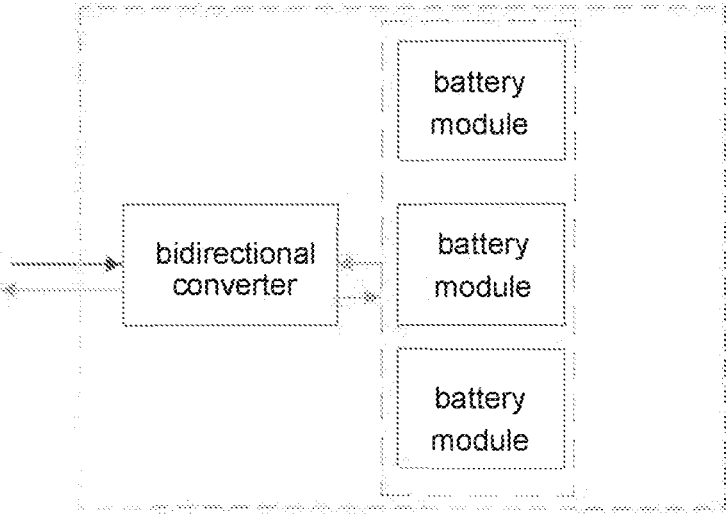
FIG. 11 is a schematic diagram of a fourth configuration of an energy storage unit according to still another embodiment of the present disclosure.

FIG. 11 shows a fourth configuration of energy storage unit. Compared with the energy storage unit shown in FIG. 8, the energy storage unit shown in FIG. 11 further comprises a bidirectional converter. The charging interface and the electric supply interface of the energy storage unit are respectively electrically connected with the battery module through the bidirectional converter. The bi-directional converter can achieve conversion between DC and AC, control the charging and discharging process of the battery module, realize regulation of active power and reactive power of the electricity grid, and can also directly supply electrical energy to AC load without the electricity grid.

Figure 12:
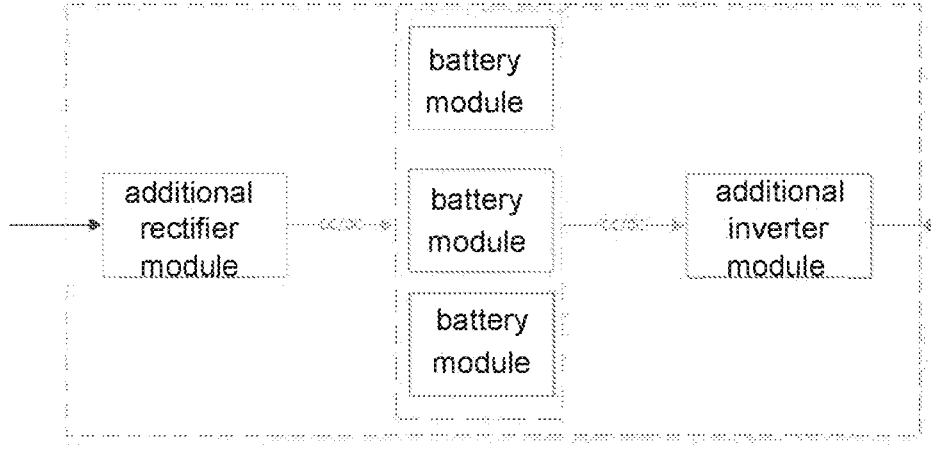
FIG. 12 is a schematic diagram of a fifth configuration of an energy storage unit according to still another embodiment of the present disclosure.

FIG. 12 shows a fifth configuration of energy storage unit. Compared with the energy storage unit shown in FIG. 10 or FIG. 11, the energy storage unit shown in FIG. 12 further includes a DC/DC converter. The DC/DC converter is arranged in series between the additional rectification module and the battery module as well as the battery module and the additional inverter module. The DC/DC converter can transform and adjust DC voltage input to the battery module as well as DC voltage output from the battery module. Of course, as an alternative embodiment, a DC/DC converter may be provided only between the additional rectification module and the battery module, or only between the battery module and the additional inverter module. In addition, the additional rectifier module and the additional inverter module can be replaced with a bidirectional converter to adjust current characteristics. In addition, it is also possible to omit the additional rectifier module and the additional inverter module with only the DC/DC converter being provided.

Figure 13:
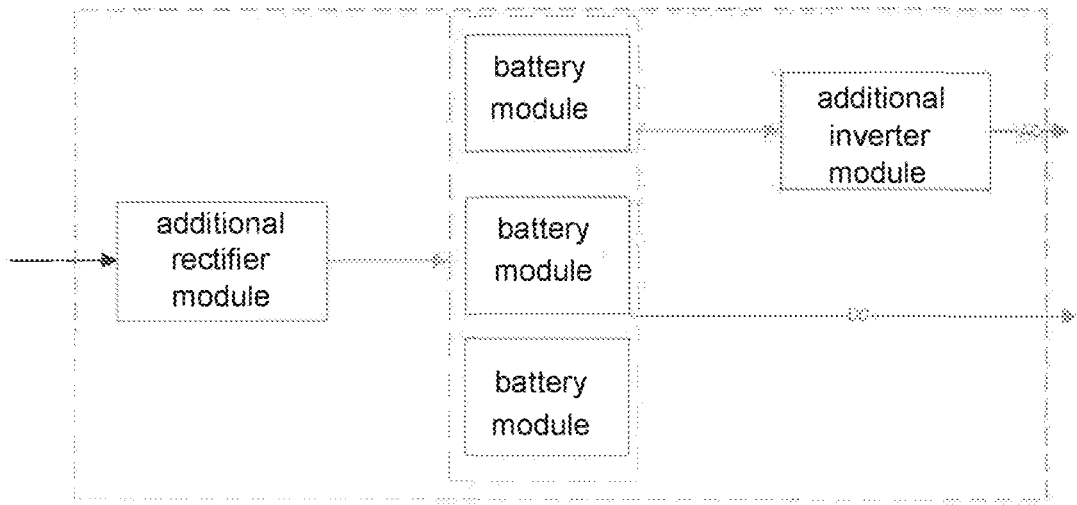
FIG. 13 is a schematic diagram of a sixth configuration of an energy storage unit according to the still another embodiment of present disclosure.

FIG. 13 shows a sixth configuration of energy storage unit. Compared with the energy storage unit shown in FIG. 10, the energy storage unit shown in FIG. 13 further comprises a DC electric supply interface. The DC electric supply interface is directly electrically connected with the battery module in parallel with the additional inverter module and the AC electric supply interface. Therefore, according to the sixth configuration, the energy storage unit can simultaneously output alternating current and direct current.

The following statements should be noted:
(1) The accompanying drawings related to the embodiments of the present disclosure involve only the structures in connection with the embodiments of the present disclosure, and other structures can be referred to common designs.
(2) In case of no conflict, features in one embodiment or in different embodiments of the present disclosure can be combined to obtain new embodiments.

The foregoing is merely exemplary embodiments of the disclosure, but is not used to limit the protection scope of the disclosure. The protection scope of the disclosure shall be defined by the attached claims.

The invention claimed is:

1. A power supply system comprising:
a first generator and a first power distribution station, wherein the first generator and the first power distribution station are connected in series; and
a first parallel operation device disposed between the first generator and the first power distribution station, wherein the first parallel operation device includes an input end connected to an output end of the first generator and an output end connected to an input end of the first power distribution station, wherein the first parallel operation device is configured to regulate one or more of a frequency, a voltage, and a phase of the first generator;
wherein a series combination of the first generator, the first parallel operation device, and the first power distribution station is connected in parallel with a second series combination of a second generator, a second parallel operation device, and a second power distribution station.

2. The power supply system of claim 1, wherein an output voltage of the first generator is 10 to 15 kV.

3. The power supply system of claim 1, wherein the first generator is a turbine generator.

4. The power supply system of claim 1, wherein the first parallel operation device includes a synchronizing device.

5. The power supply system of claim 1, wherein the second parallel operation device is electrically connected to an output end of the second generator.

6. The power supply system of claim 1, wherein a power distribution voltage of the first power distribution station is 10 to 15 kV.

7. The power supply system of claim 1, wherein a power distribution voltage of the second power distribution station is a 10 to 15 kV.

8. The power supply system of claim 1, further comprising a step-up transformer disposed between the first power distribution station and the first parallel operation device.

9. The power supply system of claim 1, wherein a power distribution voltage of the first power distribution station is 35 kV.

10. The power supply system of claim 1, further comprising an energy storage unit.

11. A power supply system for an electrically driven wellsite facility, comprising a combined power supply module connected with the electrically driven wellsite facility, the combined power supply module comprising:
an energy storage unit and a first power distribution station, wherein the energy storage unit and the first power distribution station are connected in series for supplying power to the electrically driven wellsite facility; and
a wellsite power distribution facility disposed between the first power distribution station and the electrically driven wellsite facility, wherein the wellsite power distribution facility includes an input end connected to an output end of the first power distribution station and an output end connected to an input end of the electrically driven wellsite facility.

12. The power supply system of claim 11, further comprising a first generator and a second power distribution station disposed in parallel, and wherein an output end of the first generator is connected with the electrically driven wellsite facility, and an output end of the second power distribution station is connected with the electrically driven wellsite facility.

13. The power supply system of claim 12, wherein the input end of the wellsite power distribution facility is electrically connected to the output end of the first generator and the output end of the second power distribution station.

14. The power supply system of claim 13, wherein the combined power supply module further comprises a parallel operation device which is disposed between the first generator and the wellsite power distribution facility and electrically connected to the output end of the first generator and to the input end of the wellsite power distribution facility, wherein a series combination of the first generator and the parallel operation device is connected in parallel with another power distribution station.

15. The power supply system of claim 14, wherein the parallel operation device is configured to regulate one or more of a frequency, a voltage, and a phase of the first generator.

16. The power supply system of claim 13, further comprising a first overhead line, wherein a head end of the first overhead line is electrically connected to the output end of the second power distribution station, and a tail end of the first overhead line is electrically connected to the wellsite power distribution facility.

17. The power supply system of claim 16, wherein the power supply system further comprises a first voltage compensator disposed between the tail end of the first overhead line and the wellsite power distribution facility, with the tail end of the first overhead line being connected to the wellsite power distribution facility by a first connecting cable and the first voltage compensator being electrically connected to the first connecting cable.

18. The power supply system of claim 17, wherein a power distribution voltage of the second power distribution station is 10 to 15 kV.

19. The power supply system of claim 16, further comprising a third power distribution station, a second overhead line, and a step-down transformer connected in series, wherein the second overhead line has a head end connected to an output end of the third power distribution station, and a tail end connected to a first side of step-down transformer; and a second side of the step-down transformer is connected to the input end of the wellsite power distribution facility.

20. The power supply system of claim 19, further comprising a third overhead line, wherein a head end of the third overhead line is electrically connected to the output end of the first power distribution station, and a tail end of the third overhead line is electrically connected to the wellsite power distribution facility.

21. The power supply system of claim 20, wherein the power supply system further comprises a second voltage compensator, and wherein the second voltage compensator is disposed between the tail end of the third overhead line and the wellsite power distribution facility, with the tail end of the third overhead line being connected to the wellsite power distribution facility by a second connecting cable, and the second voltage compensator being electrically connected to the second connecting cable.

22. The power supply system of claim 21, wherein a power distribution voltage of the first power distribution station is 10 to 15 kV.

23. The power supply system of claim 20, wherein the power supply system further comprises a second step-down transformer, and the second step-down transformer is disposed between the tail end of the third overhead line and the wellsite power distribution facility.

24. The power supply system of claim 23, further comprising a step-up transformer connected with the first power distribution station.

25. The power supply system of claim 23, wherein a power distribution voltage of the first power distribution station is 35 kV.

* * * * *